(12) United States Patent
Mahgerefteh et al.

(10) Patent No.: US 10,845,669 B2
(45) Date of Patent: Nov. 24, 2020

(54) VERTICAL JUNCTION BASED SILICON MODULATOR

(71) Applicant: Finisar Corporation, Sunnyvale, CA (US)

(72) Inventors: Daniel Mahgerefteh, Los Angeles, CA (US); Ying Luo, Sunnyvale, CA (US); Shiyun Lin, San Diego, CA (US); Jin-Hyoung Lee, Sunnyvale, CA (US)

(73) Assignee: II-VI Delaware Inc., Wilmington, DE (US)

( * ) Notice: Subject to any disclaimer, the term of this patent is extended or adjusted under 35 U.S.C. 154(b) by 0 days.

(21) Appl. No.: 16/271,467

(22) Filed: Feb. 8, 2019

(65) Prior Publication Data
US 2020/0257180 A1    Aug. 13, 2020

(51) Int. Cl.
*G02F 1/225*    (2006.01)
*G02F 1/21*    (2006.01)

(52) U.S. Cl.
CPC ...... *G02F 1/2257* (2013.01); *G02F 2001/212* (2013.01); *G02F 2203/50* (2013.01)

(58) Field of Classification Search
CPC ............. G02F 1/2257; G02F 2001/212; G02F 2203/50
See application file for complete search history.

(56) References Cited

U.S. PATENT DOCUMENTS

| | | | | |
|---|---|---|---|---|
| 6,240,233 B1 * | 5/2001 | Weinert | ................. | G02B 6/305 385/131 |
| 6,310,995 B1 * | 10/2001 | Saini | ..................... | B82Y 20/00 385/28 |
| 6,396,984 B1 * | 5/2002 | Cho | ..................... | G02B 6/1228 385/28 |
| 6,483,967 B2 * | 11/2002 | Tang | ..................... | G02B 6/305 385/43 |
| 6,980,720 B2 * | 12/2005 | Gothoskar | ........... | G02B 6/1228 385/129 |
| 7,035,509 B2 * | 4/2006 | Payne | ................ | G02B 6/1228 385/129 |
| 7,747,122 B2 * | 6/2010 | Shetrit | ............... | G02B 6/12004 359/279 |
| 8,014,636 B2 * | 9/2011 | Shubin | ................. | B82Y 20/00 257/21 |

(Continued)

OTHER PUBLICATIONS

Grajales et al., Vertical Adiabatic Taper for Efficient In-coupling in Nano-interferometric Waveguide Biosensors, in 2017 European Conference on Lasers and Electro-Optics and European Quantum Electronics Conference, (Optical Society of America, 2017), paper CL_4_1. (Year: 2017).*

(Continued)

*Primary Examiner* — Peter Radkowski
(74) *Attorney, Agent, or Firm* — Maschoff Brennan

(57) ABSTRACT

In one example embodiment, an optical circuit for optical modulation of light may include an input waveguide including a first thickness, an optical modulator including a second thickness, and a tapered transition that optically couples the optical modulator and the input waveguide. The second thickness may be smaller than the first thickness. The tapered transition may adiabatically transform the optical mode of the input waveguide to the optical modulator.

16 Claims, 18 Drawing Sheets

(56) References Cited

U.S. PATENT DOCUMENTS

| | | | | |
|---|---|---|---|---|
| 8,472,766 B2* | 6/2013 | Spector | | G02B 6/136 257/E33.067 |
| 8,913,860 B2* | 12/2014 | Ushida | | G02B 6/1228 385/131 |
| 8,965,157 B2* | 2/2015 | Sakakibara | | G02B 6/136 385/43 |
| 9,036,953 B2* | 5/2015 | Witzens | | G02F 1/0121 385/142 |
| 9,036,968 B2* | 5/2015 | Gubenko | | G02B 6/1228 385/43 |
| 9,285,651 B2* | 3/2016 | Chen | | G02F 1/025 |
| 9,952,456 B2* | 4/2018 | Huang | | G02F 1/015 |
| 2005/0244104 A1* | 11/2005 | Payne | | G02B 6/1228 385/43 |
| 2006/0285797 A1* | 12/2006 | Little | | G02B 6/1228 385/43 |
| 2007/0286552 A1* | 12/2007 | Aalto | | G02B 6/125 385/50 |
| 2010/0067846 A1* | 3/2010 | Tokushima | | G02B 6/1228 385/14 |
| 2010/0080504 A1* | 4/2010 | Shetrit | | G02B 6/12004 385/14 |
| 2010/0215309 A1* | 8/2010 | Shubin | | B82Y 20/00 385/3 |
| 2011/0170825 A1* | 7/2011 | Spector | | G02B 6/1228 385/43 |
| 2012/0201488 A1* | 8/2012 | Liow | | G02F 1/025 385/3 |
| 2013/0016942 A1* | 1/2013 | Gubenko | | G02B 6/1228 385/14 |
| 2013/0170793 A1* | 7/2013 | Ushida | | G02B 6/1228 385/43 |
| 2014/0127842 A1* | 5/2014 | Song | | G02F 1/025 438/31 |
| 2014/0241658 A1* | 8/2014 | Chen | | G02F 1/025 385/3 |
| 2014/0248019 A1* | 9/2014 | Witzens | | G02F 1/0121 385/2 |
| 2014/0286616 A1* | 9/2014 | Heideman | | G02B 6/1228 385/131 |
| 2015/0010266 A1* | 1/2015 | Webster | | G02B 6/305 385/14 |
| 2015/0285997 A1* | 10/2015 | Pan | | G02B 6/305 385/28 |
| 2016/0109731 A1* | 4/2016 | Huang | | G02F 1/015 385/3 |
| 2016/0131837 A1* | 5/2016 | Mahgerefteh | | G02B 6/1223 385/14 |
| 2016/0299363 A1* | 10/2016 | Wei | | G02F 1/025 |

OTHER PUBLICATIONS

Khilo et al., Efficient planar fiber-to-chip coupler based on two-stage adiabatic evolution, Optics Express, V. 18, N. 15, 2010, p. 15790 (Year: 2010).*

Park et al., A fiber-to-chip coupler based on Si/SiON cascaded tapers for Si photonic chips, Optics Express, V. 21, N. 24, 2013, p. 29313 (Year: 2013).*

Strain et al., Compact Semiconductor Tapers for Deep-to-Shallow Etch Transitions, IEEE Photonics Technology Letters, vol. 19, No. 19, Oct. 1, 2007, p. 1544 (Year: 2007).*

\* cited by examiner

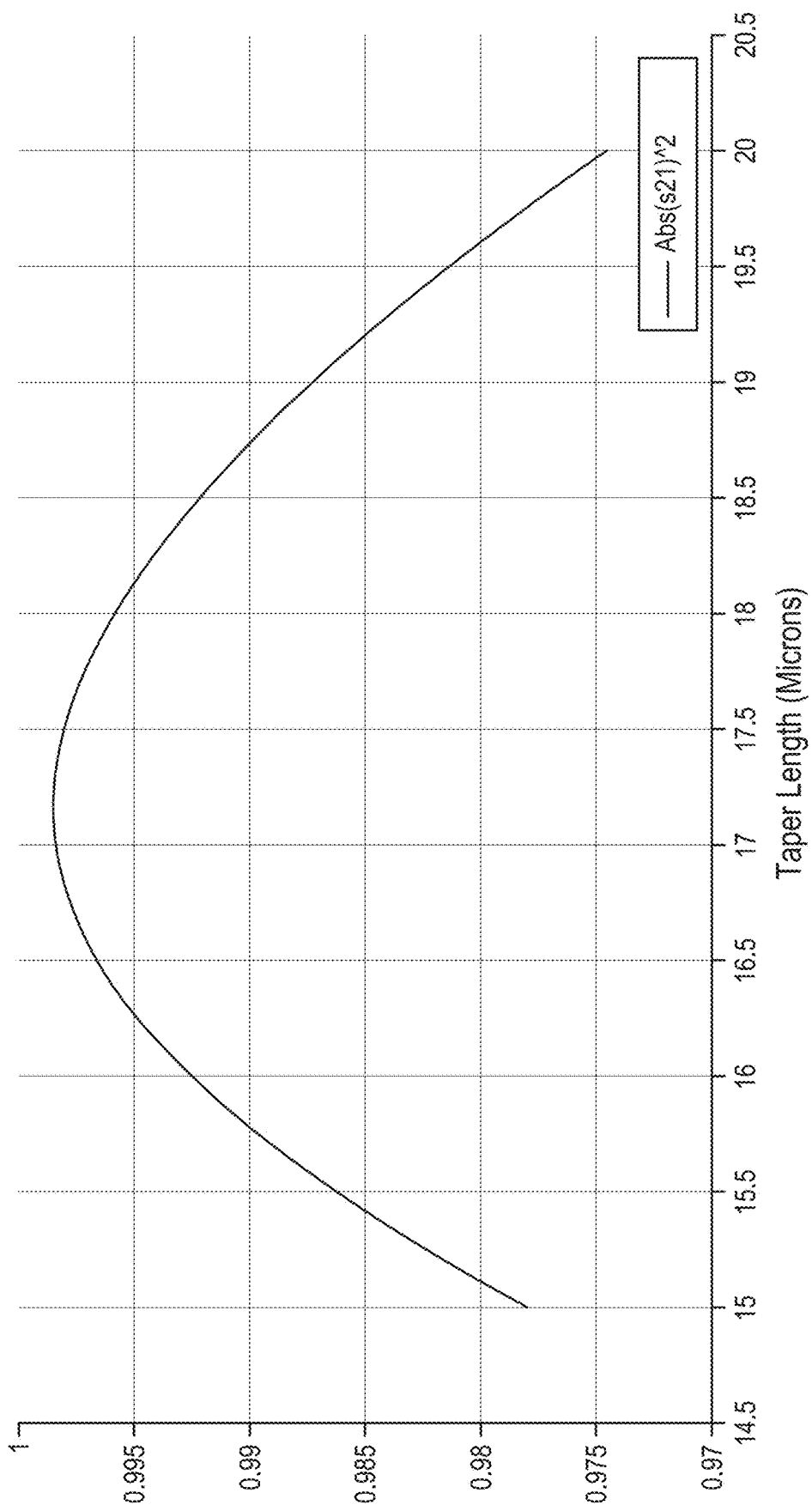

VERTICAL JUNCTION BASED SILICON MODULATOR

BACKGROUND

The present disclosure generally relates to high efficiency modulators for silicon photonics devices. In particular, some of the embodiments described herein include high efficiency modulators for silicon on insulator (SOI) platforms.

Silicon photonics involve the use of silicon as an optical medium for optical or optoelectronic devices. In some photonics devices, the silicon may be positioned on top of a layer of silicon, such configurations are known as silicon on insulator (SOI). The silicon may be patterned into photonic components or micro-photonic components. Silicon photonic devices may be made using existing semiconductor fabrication techniques, and because silicon is already used as the substrate for some integrated circuits, it may be possible to create hybrid devices in which the optical and electronic components are integrated onto a single microchip.

Silicon photonic devices may be implemented in optical networks used to communicate optical signals for transmitting information among various nodes of a telecommunications network. To transmit data in an optical network, the data may be converted from an electrical signal to an optical signal using an optoelectronic device. Optical networks are one example of an environment where the silicon photonic devices described herein may be implemented. However, the concepts described may also be implemented in other circumstances. For example, silicon photonic devices may be implemented in computer processing, sensors, optical routing, signal processing or other suitable applications. The embodiments disclosed herein are not limited to any specific environment unless indicated by context.

The claimed subject matter is not limited to embodiments that solve any disadvantages or that operate only in environments such as those described above. This background is only provided to illustrate examples of where the present disclosure may be utilized.

SUMMARY

The present disclosure generally relates to high efficiency modulators for silicon photonics devices. In particular, some of the embodiments described herein include high efficiency modulators for silicon on insulator (SOI) platforms.

In some example embodiments, an optical circuit for optical modulation of light may include an input waveguide including a first thickness, an optical modulator including a second thickness, and a tapered transition that optically couples the optical modulator and the input waveguide. The second thickness may be smaller than the first thickness. The tapered transition may adiabatically transform the optical mode of the input waveguide to the optical modulator.

The tapered transition may include a first waveguide portion including the first thickness and a second waveguide portion including the second thickness. The tapered transition may include a first tapering portion that may include a first length; and a second tapering portion that may include a second length. The first length and the second length may be sufficiently large enough to adiabatically transform the optical mode of the optical signals traveling through the first tapering portion and the second tapering portion.

The tapered transition may include a first waveguide portion that may include a first taper, a second waveguide portion that may include a second taper, and a third waveguide portion that may include a third taper. The first waveguide portion may have a first thickness, the second waveguide portion may have a second thickness, and the third waveguide portion may have a third thickness. The first thickness may be larger than the second thickness, and the second thickness may be larger than the third thickness.

The first waveguide portion may be formed by a first etch, the second waveguide portion may be formed by a second etch deeper than the first etch, and the third waveguide portion may be formed by a third etch deeper than the second etch. The first waveguide portion may be a double rib waveguide and the third waveguide portion may be a rib waveguide.

The tapered transition may include a first tapering portion that includes a first length, a second tapering portion that includes a second length, and a third tapering portion that includes a third length. The first length, the second length, and the third length may be sufficiently large enough to adiabatically transform the optical mode of the optical signals traveling through the first tapering portion and the second tapering portion.

The optical circuit further may include a coupling portion between the second tapering portion and the third tapering portion to allow the mode of optical signals to stabilize before reaching the third tapering portion.

The tapered transition may include a first waveguide portion that includes a first thickness, a second waveguide portion that includes a second thickness, and a third waveguide portion that includes a third thickness. The first thickness may be larger than the second thickness, and the second thickness may be larger than the third thickness. The first waveguide portion may be a rib waveguide, the second taper may be a strip waveguide, and the third waveguide portion may be a rib waveguide.

The optical circuit further may include a first taper decreasing the width of the first waveguide portion, a second taper decreasing the width of the second waveguide portion and the third waveguide portion, a third taper decreasing the width of the second waveguide, and a fourth taper increasing the width of the third waveguide portion.

The optical modulator may be a Mach-Zehder modulator. The first thickness may be between 300 nm and 310 nm and the second thickness may be between 160 nm and 220 nm. The optical modulator may include an n-doped region and a p-doped region. The n-doped region and the p-doped region may be positioned vertically with respect to one another in a waveguide to form a vertical PN junction.

The optical circuit may include a silicon on insulator photonic device. The second thickness of the optical modulator may be smaller than the first thickness of the input waveguide to improve optical confinement of the optical modulator. The tapered transition may confine the optical mode from the first thickness of the input waveguide to the second thickness of the optical modulator. The optical mode may be confined with substantially no transition loss through the tapered transition.

The optical circuit further may include cladding surrounding at least a portion of the tapered transition. In some configurations, the optical modulator includes an input and an output including the second thickness. The optical circuit may further include an output waveguide, and the output waveguide may include the first thickness. The output waveguide may be optically coupled to the optical modulator.

This Summary introduces a selection of concepts in a simplified form that are further described below in the Detailed Description. This Summary does not identify key features or essential characteristics of the claimed subject matter, and should not be used as an aid in determining the scope of the claimed subject matter.

BRIEF DESCRIPTION OF THE DRAWINGS

FIGS. 8A-8C are graphs illustrating transition losses for tapers of different lengths.

DETAILED DESCRIPTION

Figure 1A:
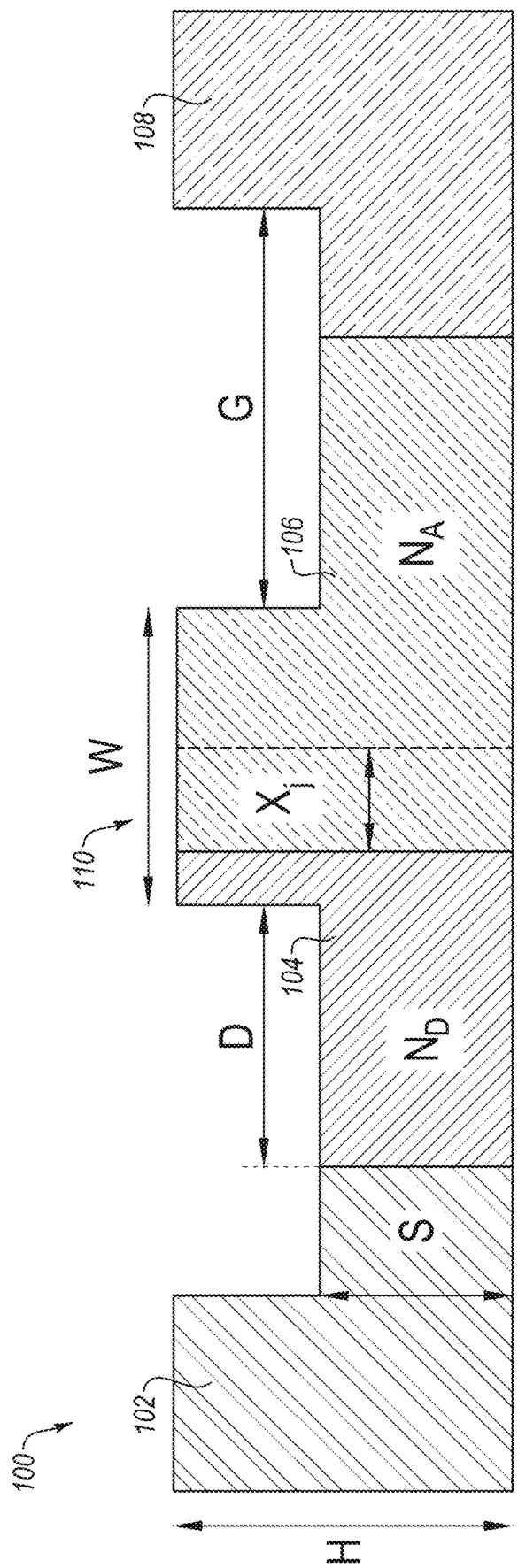
FIG. 1A is a schematic cross-section of an example of a lateral junction silicon on insulator (SOI) modulator.

The present disclosure generally relates to high efficiency modulators for silicon photonics devices. In particular, some of the embodiments described herein include high efficiency modulators for silicon on insulator (SOI) platforms.

Silicon photonics involve the use of silicon as an optical medium for optical or optoelectronic devices. In some photonics devices, the silicon may be positioned on top of a layer of silicon, such configurations are known as silicon on insulator (SOI). The silicon may be patterned into photonic components or micro-photonic components. Silicon photonic devices may be made using existing semiconductor fabrication techniques, and because silicon is already used as the substrate for some integrated circuits, it may be possible to create hybrid devices in which the optical and electronic components are integrated onto a single microchip. A photonic integrated circuit or integrated optical circuit is a device that integrates multiple (at least two) photonic functions.

Silicon photonic devices may be implemented in optical networks used to communicate optical signals for transmitting information among various nodes of a telecommunications network. To transmit data in an optical network, the data may be converted from an electrical signal to an optical signal using an optoelectronic device such as an electro-optic modulator or a directly-modulated laser. An electro-optic modulator may vary the intensity and/or the phase of the optical carrier. In silicon photonics, modulation may be achieved by varying the density of free charge carriers. Modulators may include forward-biased PIN diodes, which generally generate large phase-shifts but generally have lower speeds or reverse-biased PN junctions. Non-resonant modulators, such as Mach-Zehnder interferometers, may have dimensions in the millimeter range and may be used in telecom or datacom applications. Resonant devices, such as ring-resonators, may have dimensions of few tens of micrometers, occupying much smaller areas. To receive data in an optical network, optical signals may be converted to electrical signals using a detector such as a photodiode. Some detectors may implement a PN junction for carrier extraction. In other configurations, detectors may implement metal-semiconductor junctions integrated into silicon waveguides.

Generally, different SOI platforms are defined based on the thickness of the silicon used in the SOI. For example, multi-micron SOI's generally have a thickness of around 1 µm or greater, with a thickness of 3 µm being a common configuration. In another example, submicron SOI's may have a thickness of 160 nm, 220 nm, 250 nm, 300 nm, 306 nm, etc. The thickness of the silicon determines various characteristics of the SOI. For example, thicker SOI's may have relatively good mode confinement because there is less scattering loss, but because the mode itself is large a relatively tight wavelength band may need to be implemented and the footprint of the SOI may be relatively large. Relatively thicker SOI's are typically used for passive components to reduce optical loss and fabrication tolerances, and relatively thinner SOI's are used for active components to improve optical confinement and modulation efficiency. For example, relatively thinner SOI's (e.g., submicron SOI's) may be used for active components such as vertical junction-based modulators.

As used herein, a passive device or component may refer to features that only have photonics, with no electronic components, and an active device or component may refer to features that have both optical and electronic aspects. For example, passive components may include waveguides, directional couplers, splitters, rotators, polarizers, multiplexers, demultiplexers, and others. In another example, active components may include optical transmitters, optical detectors, modulators, lasers, photodiodes, and others.

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

As mentioned, SOI platforms may be used for active components, such as modulators. SOI-based modulators may include lateral junction configurations, where the PN junction is formed laterally in the SOI, and vertical junction configurations, where the PN junction is formed vertically in the SOI.

Figure 1B:
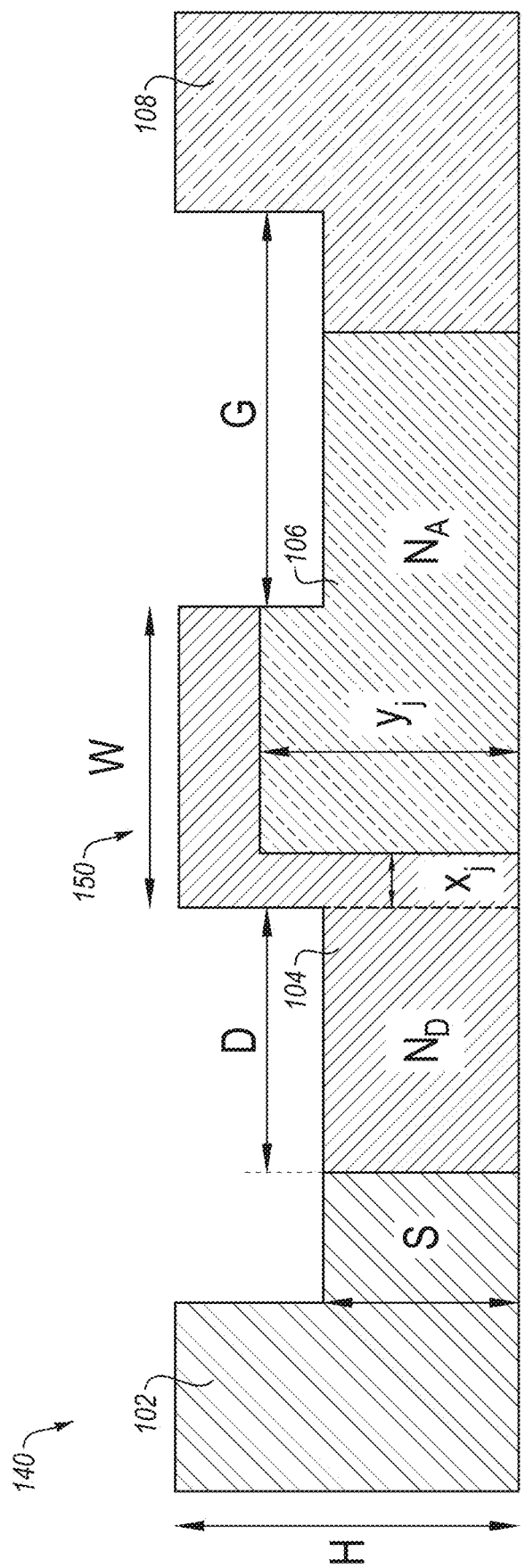
FIG. 1B is a schematic cross-section of an example of a vertical junction SOI modulator.

FIGS. 1A and 1B are example embodiments of SOI modulators. In particular, FIG. 1A is a schematic cross-section of a lateral junction SOI modulator 100, and FIG. 1B is a schematic cross-section of a vertical junction SOI modulator 140.

As shown in FIG. 1A, the SOI modulator 100 may include a silicon waveguide with a highly n-doped region 102, a n-doped region 104, a p-doped region 106, a highly p-doped region 108, and a lateral PN junction 110. The highly n-doped 102 and highly p-doped region 108 are used to reduce resistance and needed to be placed far enough from the optical mode to avoid high optical absorption loss. The n-doped 104 and p-doped region 106 are used to form the PN junction 110. The doping densities in regions 104, 106 will affect the modulation efficiency and may be optimized.

In some circumstances, the doping in the highly n-doped region 102 may be greater than the doping in the n-doped region 104. For example, the doping of the highly n-doped region 102 may be approximately $10^{18}$-$10^{19}$ and the doping of the n-doped region 104 may be approximately $10^{17}$. Similarly, the doping in the highly p-doped region 108 may be greater than the doping in the p-doped region 106. For example, the doping of the highly p-doped region 108 may be approximately $10^{18}$-$10^{19}$ and the doping of the p-doped region 106 may be approximately $10^{17}$.

The SOI modulator 100 may include dimensions H, S, D, W, and G. H is the height of the waveguide. S is the height of slab region. D is the distance between the highly n-doped region 102 and the PN junction 110. W is the width of the PN junction 110. G is the width of slab region. $X_3$ is width of the depletion region of the PN junction. The n-doped region 104 may include a doping level or doping density $N_d$, and the p-doped region 106 may include a doping level or doping density $N_A$.

The efficiency of the SOI modulator 100 may be represented by the Equation 1:

$$\Delta\phi \propto \frac{\Delta n}{n_{eff}} \Gamma \propto \frac{N}{n_{eff}} \frac{HL\Delta w_d}{HLW} \propto \frac{\sqrt{N}}{n_{eff}W}\left(\sqrt{V+\phi_B} - \sqrt{\phi_B}\right)$$

In the above equation, Δn denotes refractive index difference before and after applying modulation voltage denoted as V, $n_{eff}$ denotes optical mode effective index, N denotes free carrier density, H denotes the height of the waveguide, L denotes length of the waveguide, W denotes width of the waveguide, $\Delta w_d$ denotes the change of the depletion region width, V denotes modulation voltage, and $\phi_B$ denotes DC bias.

As indicated by Equation 1, for the SOI modulator 100 with a lateral configuration, efficiency depends on the waveguide width W as well as doping levels $N_d$ and $N_a$. However, for waveguides with the same doping levels, a narrower waveguide will have a higher efficiency.

As shown in FIG. 1B, the vertical junction SOI modulator 140 includes aspects similar to the lateral junction SOI modulator 100, and similar features are indicated with the same numbering as FIG. 1A. However, the vertical junction SOI modulator 140 includes a vertical PN junction 150 rather than the lateral PN junction 110.

The efficiency of the SOI modulator 140 may be represented by the Equation 2:

$$\Delta\phi \propto \frac{\Delta n}{n_{eff}} \Gamma \propto \frac{N}{n_{eff}} \frac{WL\Delta w_d}{HLW} \propto \frac{\sqrt{N}}{n_{eff}H}\left(\sqrt{V+\phi_B} - \sqrt{\phi_B}\right)$$

In the above equation, Δn denotes refractive index difference before and after applying modulation voltage denoted as V, $n_{eff}$ denotes optical mode effective index, N denotes free carrier density, H denotes the height of the waveguide, L denotes length of the waveguide, W denotes width of the waveguide, $\Delta w_d$ denotes the change of the depletion region width, V denotes modulation voltage, and $\phi_B$ denotes DC bias.

As indicated by Equation 2, for the SOI modulator 140 with a vertical configuration, if the mode of the optical signals are very well defined inside the waveguide, then we will have an approximation that efficiency is related to the inverse of the height H (e.g., the thickness of the SOI waveguide). Accordingly, a thinner SOI waveguide may results in better SOI modulator performance.

As indicated by Equations 1 and 2, the operation and/or the efficiency of the SOI modulators 100, 140 may depend on the dimensions or geometric design of the PN junctions 110, 150, waveguide doping levels, and/or optical mode overlap with the depletion region. In some circumstances, if the optical mode is well confined inside the silicon waveguide, to the first-order approximation, the efficiency of the lateral junction SOI modulator 100 may be proportional to the waveguide width W, which may be limited by the propagation loss. In contrast, for the vertical junction SOI modulator 140, if the optical mode is well confined inside the silicon waveguide, to the first-order approximation, the efficiency of the vertical junction SOI modulator 140 may be proportional to the SOI thickness H, which may depend on the SOI platform implemented (e.g., the thickness of the SOI platform selected).

In some circumstances, the efficiency of vertical junction SOI modulators, such as the vertical junction SOI modulator 140, may be greater than that of lateral junction SOI modulator designs, such as the lateral junction SOI modulator 100, because the width W of the waveguide may be increased to increase the mode overlap with the depletion region. However, the modulation efficiency of the vertical junction SOI modulator 140 may be limited by the vertical confinement factor of the optical mode, which may depend on the dimensions of the vertical junction SOI modulator 140, and in particular on the width of the waveguide which in turn depends on the SOI platform selected.

Typical submicron SOI platforms that are implemented for SiP may include 300 nm and 220 nm. In general, thicker SOI platforms (e.g., 300 nm and larger) have a well-confined optical mode, and hence lower propagation loss. In addition, performance of passive devices is less affected by processing variations for relatively thicker SOI platforms. However, thinner SOI platforms (e.g., 220 nm and smaller) may result in higher vertical confinement which may further increase the modulation efficiency of vertical junction based high speed modulators, such as the vertical junction SOI modulator 140. Nevertheless, some thinner SOI platforms may have higher propagation loss, and may be more susceptible to processing variations and errors.

As mentioned, thinner SOI platforms may be more susceptible to processing variations than thicker SOI platforms. To form certain components on an SOI platform, a substrate layer may be implemented so other layers may be selectively grown on top, for example, a layer of Germanium. A thicker substrate layer may be more suitable for selectively growing such layers. In particular, thicker substrate layers may result in better Germanium growth conditions. Accordingly, SOI platforms may implement thicker substrate layers to improve growing conditions, however, this may also increase the thickness of the SOI platform itself. Furthermore, as explained above, thicker SOI platforms may result in decreased modulation efficiency.

Accordingly, the disclosed embodiments include SOI devices that include two different SOI platforms (e.g., two different thicknesses) within a single SOI substrate. Such configurations may include a transition between a larger (e.g. thicker) SOI platform and a smaller (e.g., thinner) SOI platform. In such configurations, the high speed modulator may be positioned on the thinner SOI platform or layer to achieve higher modulation efficiency and reduced insertion loss, while the remaining portion of the SOI device may be included on the thicker SOI platform, so that the efficiency and performance of such features are not decreased or adversely affected. Some configurations may include vertical PN junctions and/or vertical junction SOI modulators with increased vertical confinement of the optical mode when compared to other devices with the same or similar SOI platforms. The disclosed embodiments may include different transition designs which may be suitable for different manufacturing process constraints.

Additionally or alternatively, the disclosed embodiments include optimized PN junction offset to maximize the mode overlap within depletion regions, and to minimize the doping loss. Further, the disclosed embodiments may result in enhanced phase shift efficiency and reduced doping loss. In addition, the disclosed embodiments may be implemented for high speed modulation with lumped Mach-Zehnder interferometer or modulator configurations.

In one example embodiment, an SOI device may include two different SOI platforms in a single 306 nm SOI substrate. In particular, the SOI device may include a 306 nm platform and a 160 nm platform with a transition in between. A high speed modulator may be included on the thinner 160 nm SOI layer or platform to achieve higher efficiency and lower insertion loss, while the rest of the SOI device may be included on the 306 nm SOI layer or platform, so that the efficiency and performance of such features is not decreased or adversely affected.

Figure 2:
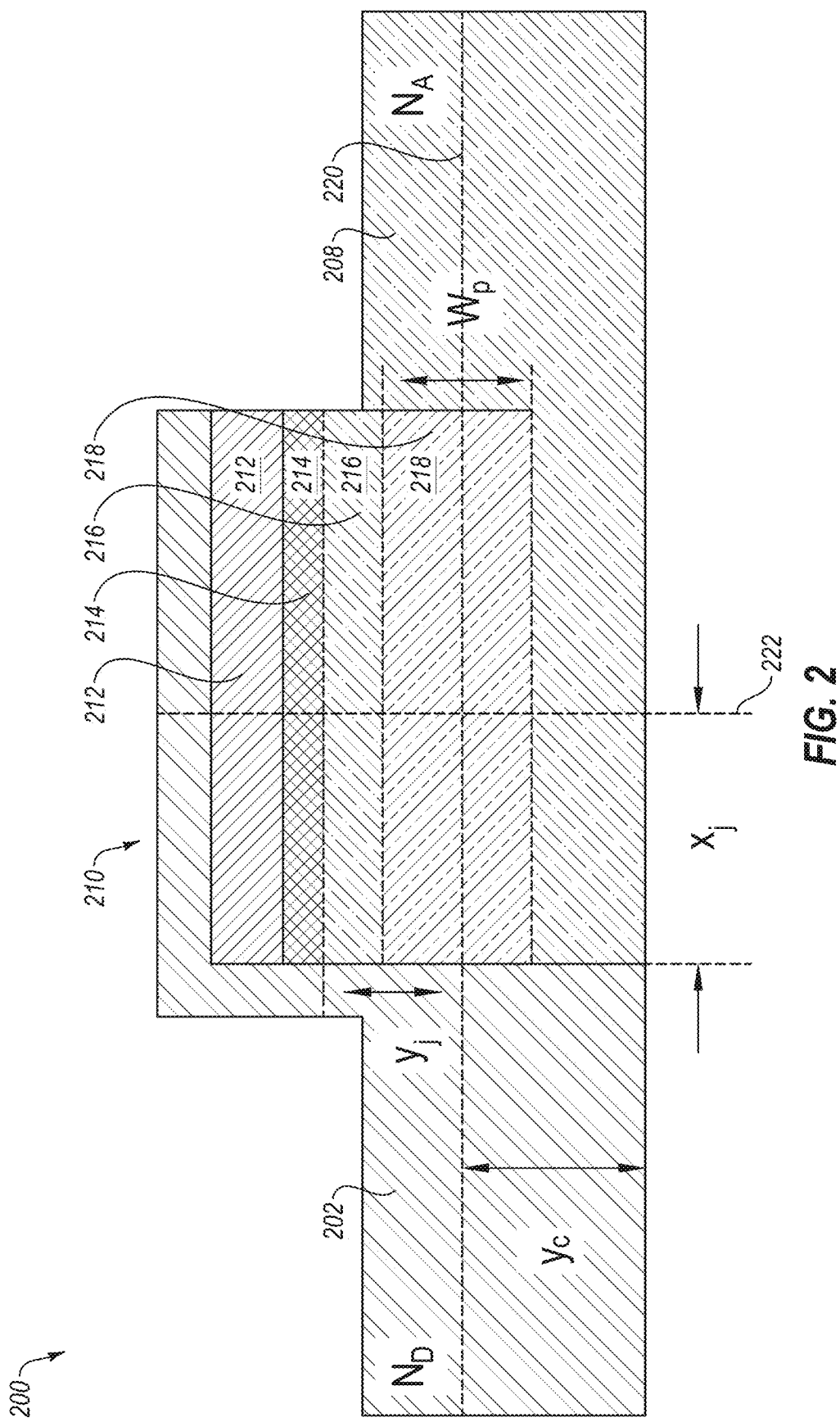
FIG. 2 is a schematic cross-section of another example of a vertical junction SOI modulator including depletion regions.

FIG. 2 is a schematic cross-section of an example of a vertical junction SOI modulator 200 including depletion regions. As shown in FIG. 2, the SOI modulator 200 may include a silicon waveguide with an n-doped region 202 and a p-doped region 208, and a vertical PN junction 210. The n-doped region 202 may include a doping level or doping density $N_d$, and the p-doped region 208 may include a doping level or doping density $N_A$. Before applying a modulation voltage V, the PN junction 210 forms an n-side depletion region 214 and p-side depletion region 216. After modulation is turned on (e.g., a modulation voltage V is applied), the n-side depletion region 214 and the p-side depletion region 216 increases. In particular, the n-side depletion region increases to an n-side depletion region 212 and p-side depletion region increases to a p-side depletion region 218.

The SOI modulator 200 may include a vertical center 220 of the optical mode in the waveguide and a lateral center 222 of the waveguide. The SOI modulator 200 may include dimensions $Y_c$, $X_j$, $Y_j$, and $W_p$. $Y_c$ is the distance from the edge of the waveguide to the vertical center 220 of the optical mode in the waveguide. $X_j$ and $Y_j$ are the positions of the vertical PN junction 210 in x and y directions with respect to the lateral center 222 of the waveguide, and the vertical center 220 of the optical mode. $W_p$ is the change of the depletion width for the voltage swing applied to the SOI modulator 200.

In some circumstances, the SOI modulator 200 may operate on the carrier depletion effect. In such circumstances, optical signals travelling through the SOI modulator 200 may be modulated by "sweep modulation," where the modulation is swept on and off the carrier, which changes the index of the waveguide so the optical signals travel through different indices. For such configurations, the carrier depletion effect may be optimized to increase the efficiency of the SOI modulator 200 as shown in FIG. 2. In particular, the geometry and position of the vertical PN junction 210 may be optimized to increase the carrier depletion effect.

Before a voltage is applied across the SOI modulator 200, the n-side depletion region 212 and p-side depletion region 218 includes free carriers. When a voltage is applied across the SOI modulator 200, the n-side depletion region 212 and p-side depletion region 218 becomes depleted, which causes the free carrier density to change in the newly depleted region which will cause the effective index to change. This effect may be used to modulate optical signals that travel through the SOI modulator 200 by using it in the Mach-Zehnder interferometer or modulator. In some configurations, voltage may be applied to the SOI modulator 200 using contacts positioned on opposite sides of the SOI modulator 200. In some circumstances, a voltage swing between 0 and 1.5V may be applied to the vertical PN junction 210 of the SOI modulator 200.

If the vertical PN junction 210 is relatively linear junction at the beginning of its formation, there may be an initial depletion area (e.g., the n-side depletion region 212 and p-side depletion region 218) even though there is no applied voltage. Once a reverse bias or voltage is applied the depletion region may become wider. Since doping levels for such modulators are usually very low, typically in the $10^{17}$ range, p-doping in this doping level is much more efficient than n-doping. For example, in some circumstances p-doping may be an order of magnitude more efficient than n-doping. Accordingly, it may be desirable to position the vertical PN junction 210 such that p-side depletion region 218 has a largest overlap with optical mode to optimize efficiency. In addition, p-doping has relatively lower depletion loss than n-doping. Accordingly, the vertical PN junction 210 may be positioned offset from the lateral center 222 of the SOI modulator 200 so the optical mode overlap in the n-doped region 202 is minimized. Additionally or alternatively, the vertical PN junction 210 may be positioned offset from the lateral center 222 of the SOI modulator 200 to align the p-side depletion region 218 with the vertical center 220 or the vertical mode center.

In some configurations, the vertical PN junction 210 may be dominated by p-doping. For example, in some aspects the majority of the vertical PN junction 210 may be p-doped. In another example, between 60% and 95% of the vertical PN junction 210 may be p-doped, and/or the remainder of the vertical PN junction 210 may be n-doped. In some configurations, the lateral position of the vertical PN junction 210 may be limited or determined by implantation process limits, such as implantation resolution.

Figure 3A:
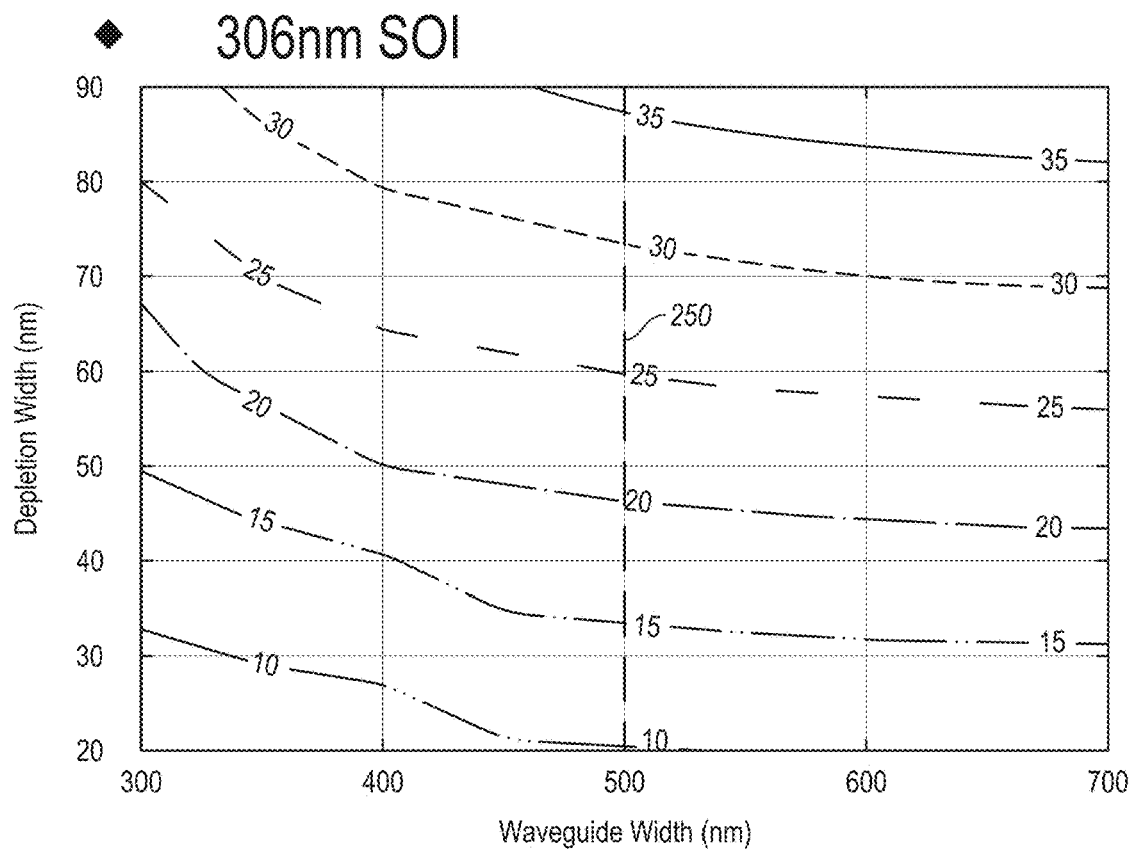
FIGS. 3A-3B are contour graphs of optical confinement in the depletion region for waveguides of different dimensions.
Figure 3B:
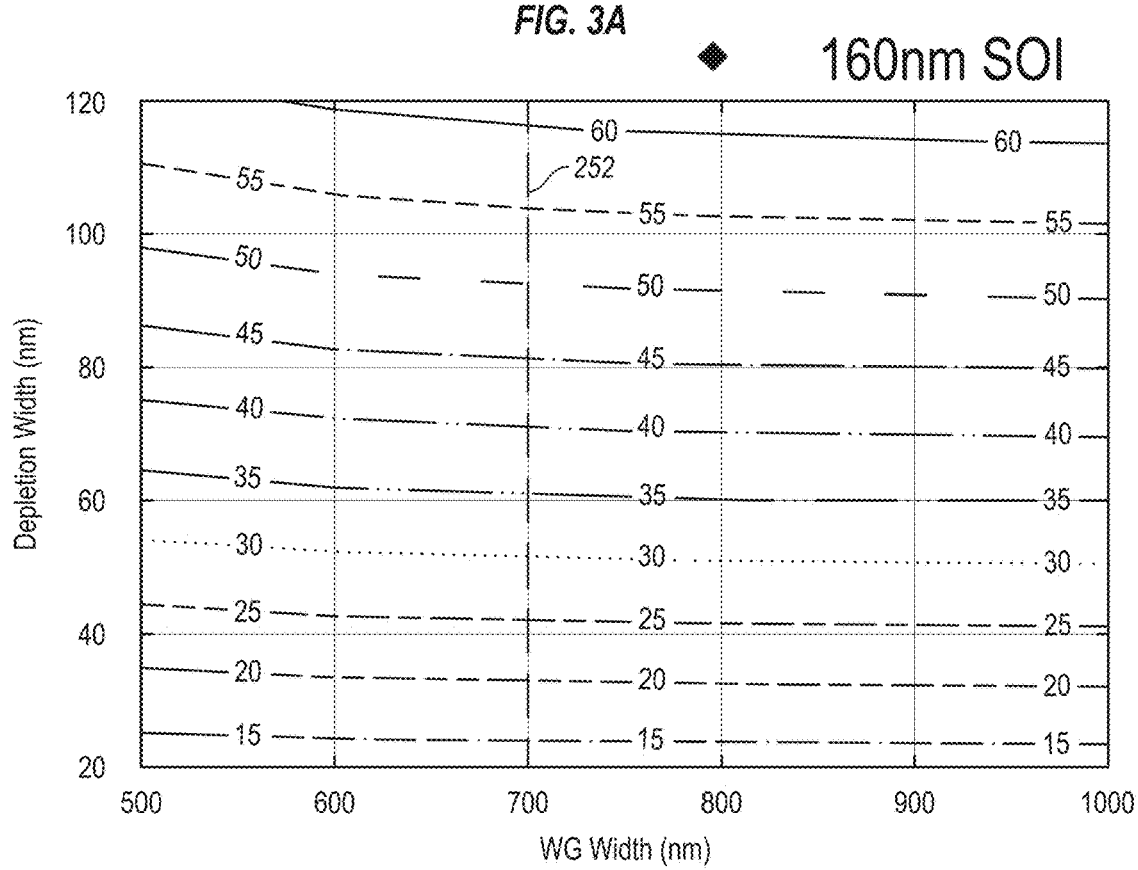

FIGS. 3A-3B are contour graphs of optical mode confinement factors in the depletion region for waveguides of different dimensions, such as different waveguide widths and different depletion widths. FIG. 3A represents confinement change in the depletion region for a 306 nm SOI platform (e.g., thickness) and FIG. 3B represents confinement change in the depletion region for a 160 nm SOI platform (e.g., thickness). In FIGS. 3A-3B, the horizontal axis represents the width of the waveguide in nanometers (nm) and the vertical axis represents the depletion width in nanometers (nm). FIGS. 3A-3B include lines representing various confinement factors of the optical mode in the depletion region.

FIG. 3A includes a line 250, denoting the depletion wave change for a 500 nm wide single mode waveguide on a 306 nm SOI platform and FIG. 3B includes a line 252, denoting the depletion wave change for a 700 nm wide single mode waveguide on a 160 nm SOI platform. Generally, the waveguide width for different SOI platforms is balanced between overall mode confinement (and thus waveguide propagation loss) and junction capacitance. The 160 nm SOI platform with a 700 nm waveguide width exhibits similar propagation loss as the 306 nm SOI platform with a 500 nm waveguide width. However, as will be explained in further detail below, the optical confinement in the depletion region (e.g., how much of the optical field is confined in the depletion region) is improved in the thinner, 160 nm SOI platform.

Figure 4:
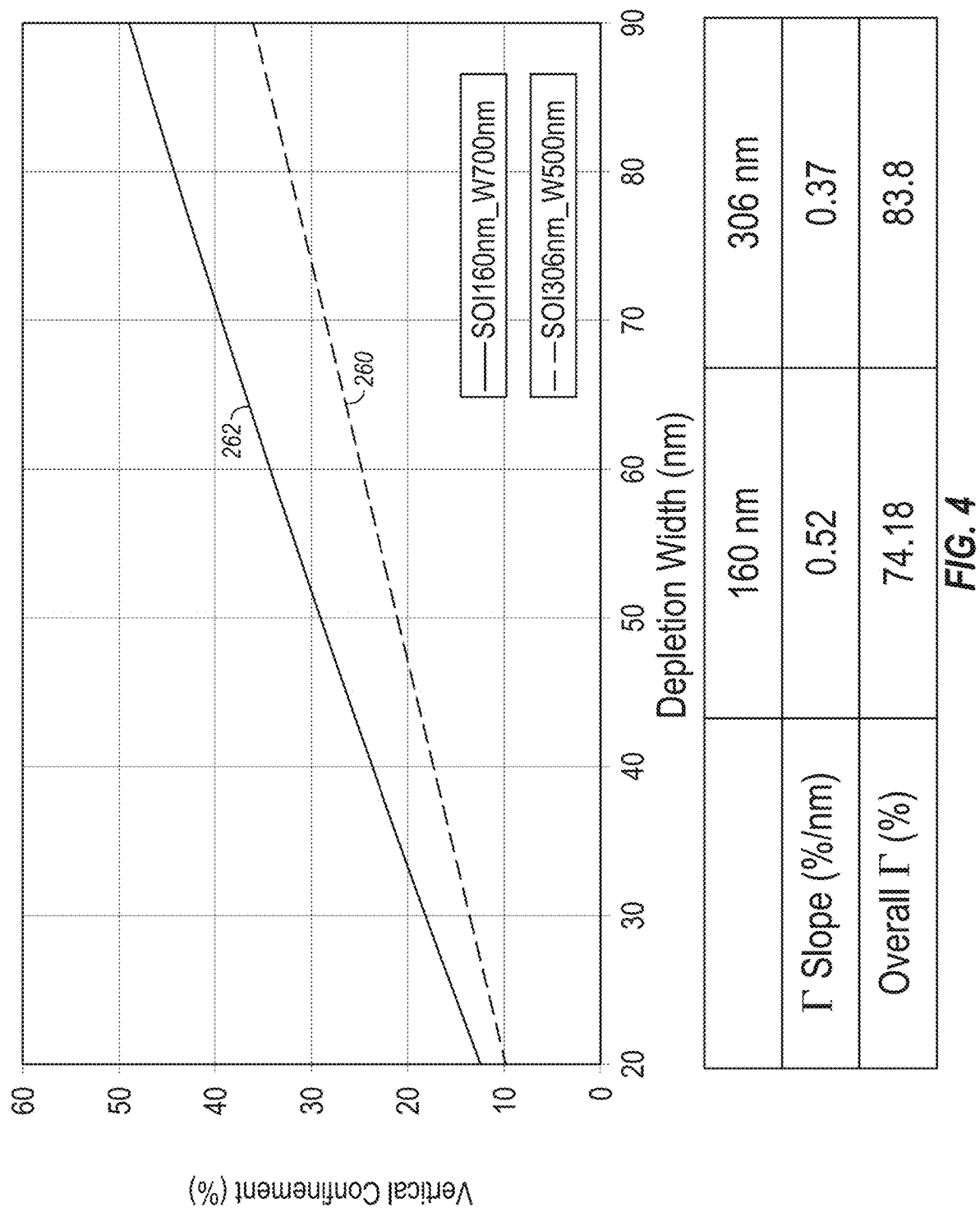
FIG. 4 is graph illustrating optical confinement versus the depletion width.

FIG. 4 is graph illustrating optical confinement versus the depletion width for the configurations of FIGS. 3A-3B. In FIG. 4, the horizontal axis represents the depletion width in nanometers (nm) and the vertical axis represents optical confinement in the depletion region, expressed as a percentage. FIG. 4 includes a line 260 indicating the optical confinement versus depletion width for the 500 nm wide single mode waveguide on the 306 nm SOI platform, and a line 262 indicating the optical confinement versus depletion width for the 700 nm wide single mode waveguide on the 160 nm SOI platform. As shown, there is about a 40% improvement in optical confinement of the thinner 160 nm SOI platform versus the thicker 306 nm SOI platform. Accordingly, the thinner SOI platform exhibits improved modulation efficiency than the thicker SOI platform. While the thinner SOI platform has less overall optical confinement in the waveguide (e.g., overall F of 74.18% versus 83.8%), it has a much larger confinement in the depletion region and a larger slope efficiency (e.g., slope of 0.52%/nm versus 0.37%/nm), thereby leading to an improvement in modulation efficiency.

Although the thinner SOI platform exhibits improved modulation efficiency, thinner SOI platforms may be more susceptible to processing variations than thicker SOI platforms. Accordingly, the disclosed embodiments include SOI devices or waveguides that include two different thicknesses within a single SOI substrate (e.g., two different waveguide thicknesses in one SOI platform). In such configurations, the high speed modulator may be positioned on the thinner SOI thickness to achieve higher modulation efficiency and reduced insertion loss, while the remaining devices may be included on the thicker SOI thickness, so that the performance and tolerance for the processing variations are not decreased or adversely affected. Some configurations may include vertical PN junctions and/or vertical junction SOI modulators with increased vertical confinement of the optical mode when compared to other devices with the same or similar SOI platforms.

The disclosed embodiments also include a transition between the thinner SOI platform and the thicker SOI platform, or between a thinner waveguide and a thicker waveguide, to permit the optical signals to travel in between the two SOI thicknesses. FIGS. 5 and 7 illustrate example embodiments of SOI devices that include two different thicknesses within a single SOI substrate. Further, FIGS. 5 and 7 illustrate example configurations of transitions between larger (e.g. thicker) and a smaller (e.g., thinner) waveguides.

Figure 5A:
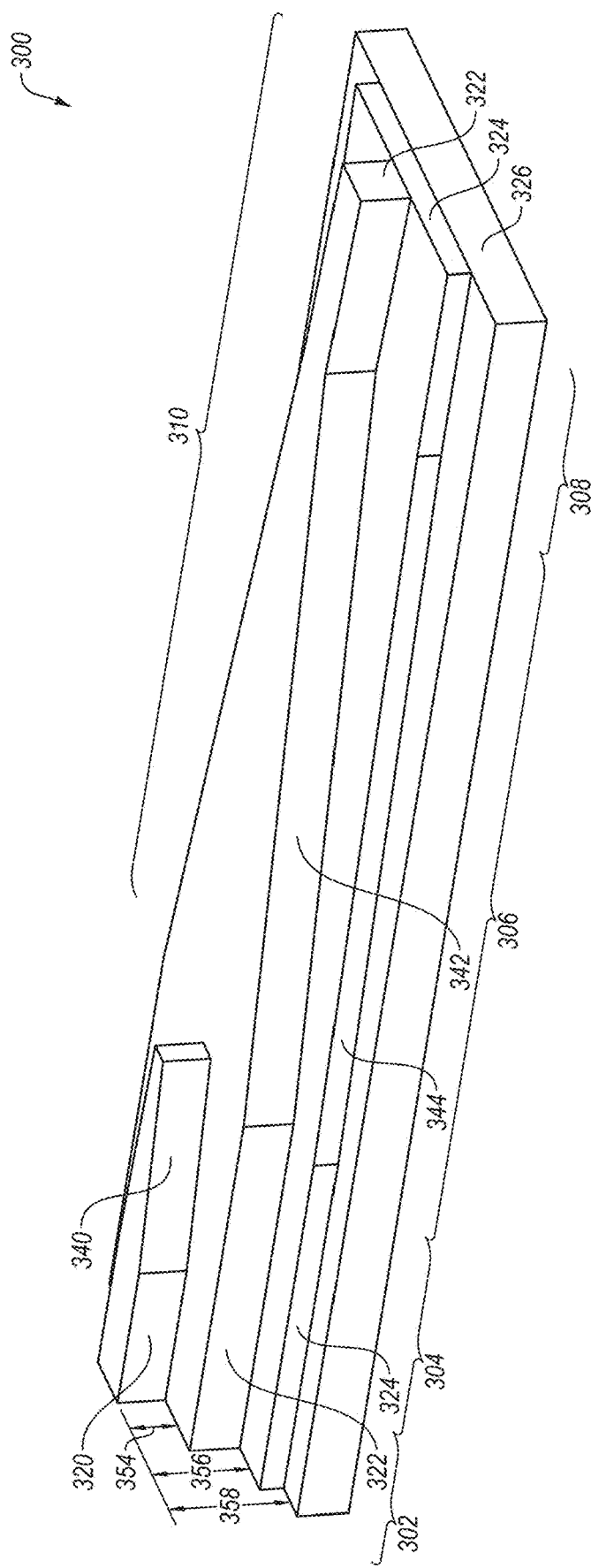
FIGS. 5A-5C are views of an example embodiment of an SOI device.
Figure 5B:
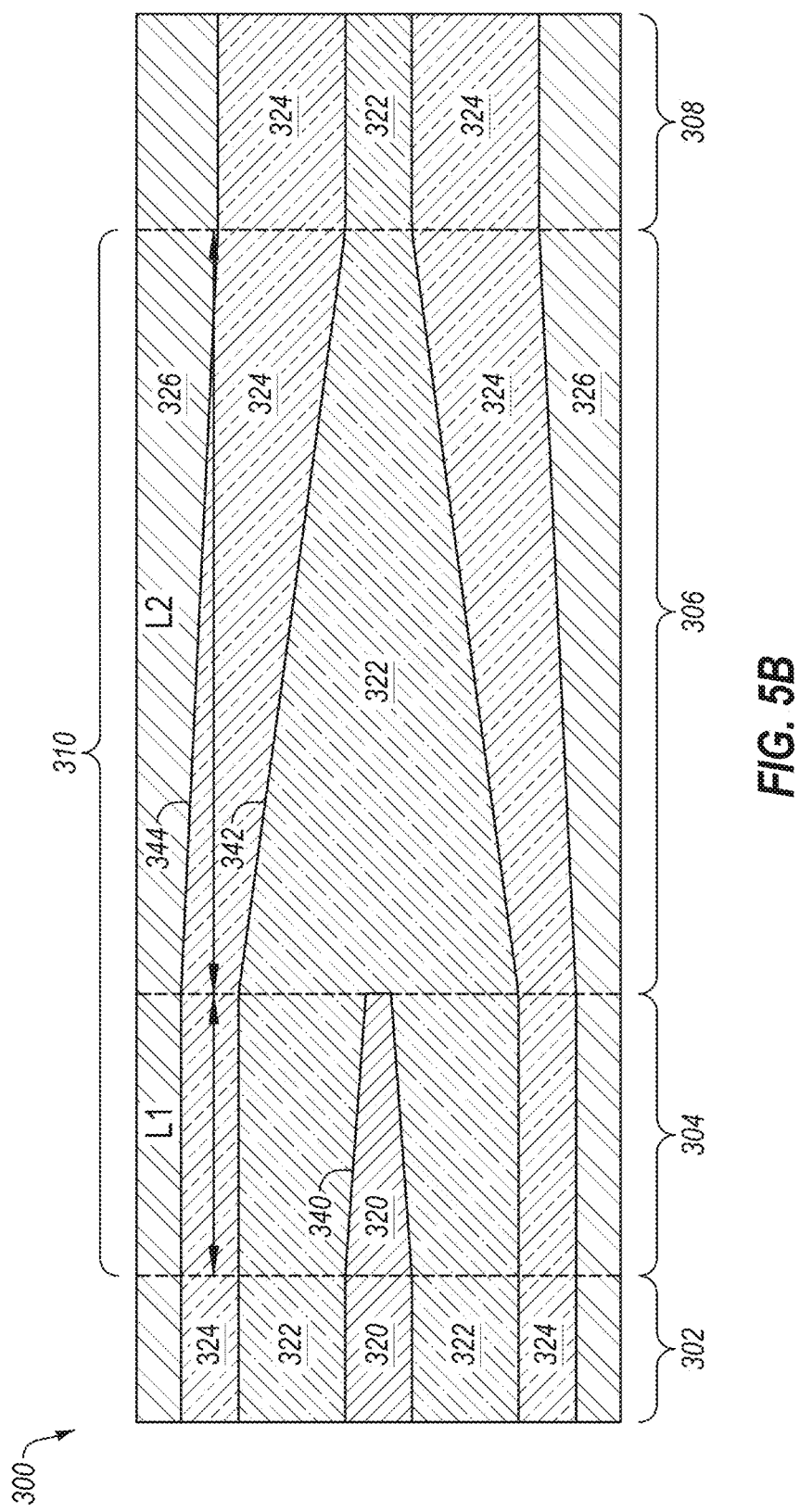
Figure 5C:
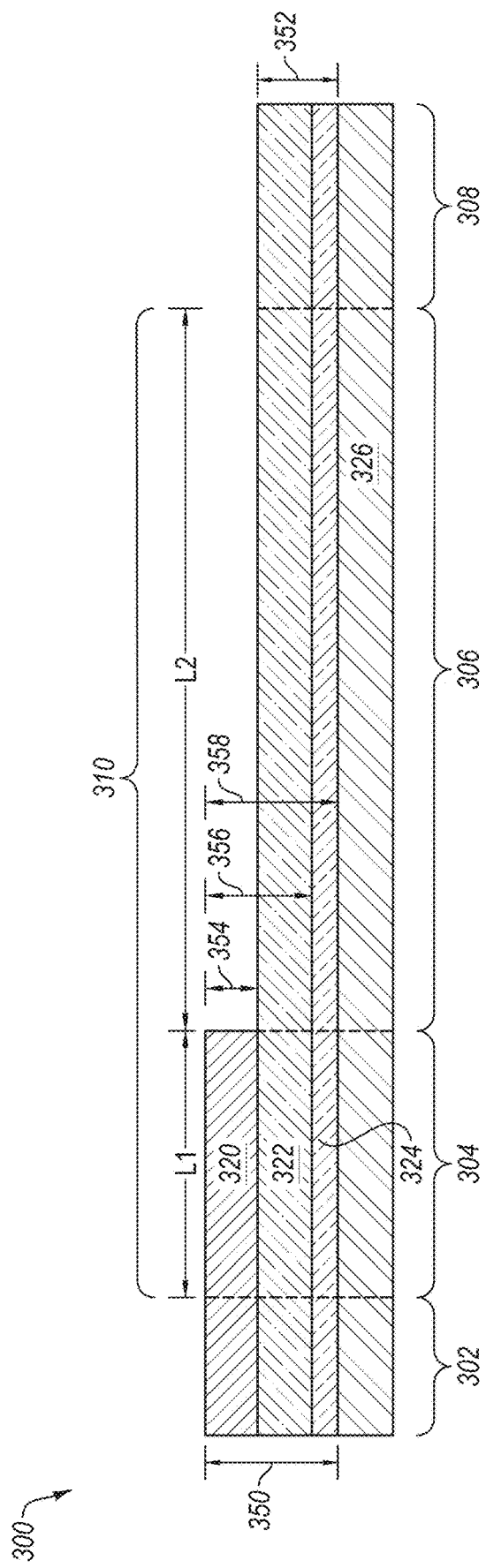

FIGS. 5A-5C are views of an example embodiment of an SOI device 300. In particular, FIG. 5A is a perspective view of the SOI device 300, FIG. 5B is a top view of the SOI device 300, and FIG. 5C is a side section of the SOI device 300.

As shown, the SOI device 300 includes a thicker waveguide portion 302 and a thinner waveguide portion 308 with a transition portion 310 positioned in between. In such configurations, the SOI device 300 may transition from a relatively thicker waveguide to a relatively thinner waveguide. In the illustrated configuration, the transition portion 310 includes a 304 and a second tapering portion 306. The first tapering portion 304 may include a length L1 and the second tapering portion 306 may include a length L2. The SOI device 300 may include cladding 326 (e.g., a silicon dioxide cladding) surrounding a silicon waveguide.

The SOI device 300 may transition between the thicker waveguide portion 302 and the thinner waveguide portion 308. For example, in the illustrated configuration the SOI device 300 transitions between a first waveguide thickness 350 and a second waveguide thickness 352 (see FIG. 5C). In some configurations, the first waveguide thickness 350 may be approximately 306 nm at the thicker waveguide portion 302, and the second waveguide thickness 352 may be approximately 160 nm at the thinner waveguide portion 308, although other configurations may be implemented.

The SOI device 300 may include a first waveguide portion 320, a second waveguide portion 322, and a third waveguide portion 324. The first waveguide portion 320 may be formed by a first etch 354, the second waveguide portion 322 may be formed by a second etch 356, and the third waveguide portion 324 may be formed by a third etch 358. The first etch 354 may be a relatively shallow etch, the second etch 356 may be deeper than the first etch 354, and the third etch 358 may be deeper than the first etch 354 and the second etch 356.

In some circumstances, the first etch 354 may be a shallow etch, the second etch 356 may be a deep etch, and the third etch 358 may be a full etch (e.g., extending fully to the cladding 326. In one example, the first etch 354 (e.g., shallow etch) may be 150 nm, the second etch 356 (e.g., deep etch) may be 250 nm and the third etch 358 (e.g., full etch) may be 306 nm. In such configurations, the first waveguide portion 320 may have a thickness of approximately 306 nm (depth from the top of the first waveguide portion 320 to the cladding 326), the second waveguide portion 322 may have a thickness of approximately 160 nm, and the third waveguide portion 324 may have a thickness of approximately 50 nm. However, other configurations may be implemented.

In some configurations, the SOI device 300 may include rib waveguides and strip waveguides. A strip waveguide may have a core with fully etched slabs on both sides of the core, a rib waveguide may have a core with relatively thinner unetched slabs on both sides of the core, a double rib waveguide may have a core with two unetched slabs on both sides of the core. In such configurations, the thicker waveguide portion 302 may be a double rib waveguide, with two etch slabs (e.g., the second waveguide portion 322 and the third waveguide portion 324) surrounding a core (e.g., the first waveguide portion 320). The thinner waveguide portion 308 may be a single rib waveguide with a slab (e.g., the third waveguide portion 324) surrounding a core (e.g., the second waveguide portion 322). As shown, the first waveguide portion 320 does not extend to the thinner waveguide portion 308 because of the transition portion 310, which transitions the SOI device 300 from a thicker waveguide (e.g., 306 nm) to a thinner waveguide (160 nm).

As shown in FIGS. 5A and 5B, the thicker waveguide portion 302 includes the first waveguide portion 320, the second waveguide portion 322, and the third waveguide portion 324. At the first tapering portion 304, the first waveguide portion 320 includes a first taper 340 while the second waveguide portion 322 and the third waveguide portion 324 remain constant. In some configurations, the first taper 340 may taper between a starting width of 400 nm and a decreased or minimum width of 80 nm. The starting width may depend on the input waveguide design. The minimum width may depend on process limitations, such as process resolution.

As shown, the second tapering portion 306 includes the second waveguide portion 322 and the third waveguide portion 324, not the first waveguide portion 320. At the second tapering portion 306, the second waveguide portion 322 includes a second taper 342 and the third waveguide portion 324 includes a third taper 344. The second taper 342 may taper between a starting width of 2 μm and a decreased or minimum width of 400 nm. The starting width may depend on design. The minimum width may depend on output rib waveguide design. The third taper 344 may taper between a starting width of 4 μm and a decreased or minimum width of 400 nm.

In some configurations, the first taper 340, the second taper 342, and the third taper 344 may be adiabatic tapers. In such configurations, the mode may be transferred through the waveguide at each of the tapers 340, 342, 344 without transition losses. Additionally or alternatively, the transition at the tapers 340, 342, 344 may be sufficiently gradual and/or smooth that transition losses at the tapers 340, 342, 344 are minimized or eliminated.

In the first tapering portion 304, the top waveguide core width (e.g., first waveguide portion 320) is tapered down and the optical mode will be pushed down from the 306 nm thick waveguide to 160 nm thick waveguide at the end of the first tapering portion 304. The second etch width is large to reduce the mode transition loss and the transition loss between the first tapering portion 304 and the second tapering portion 306. In the second tapering portion 306, the rib waveguide core (e.g. the second waveguide portion 322) and the slab (e.g., the third waveguide portion 324) are both tapered to the standard dimensions of the thinner waveguide portion 308.

Figure 6A:
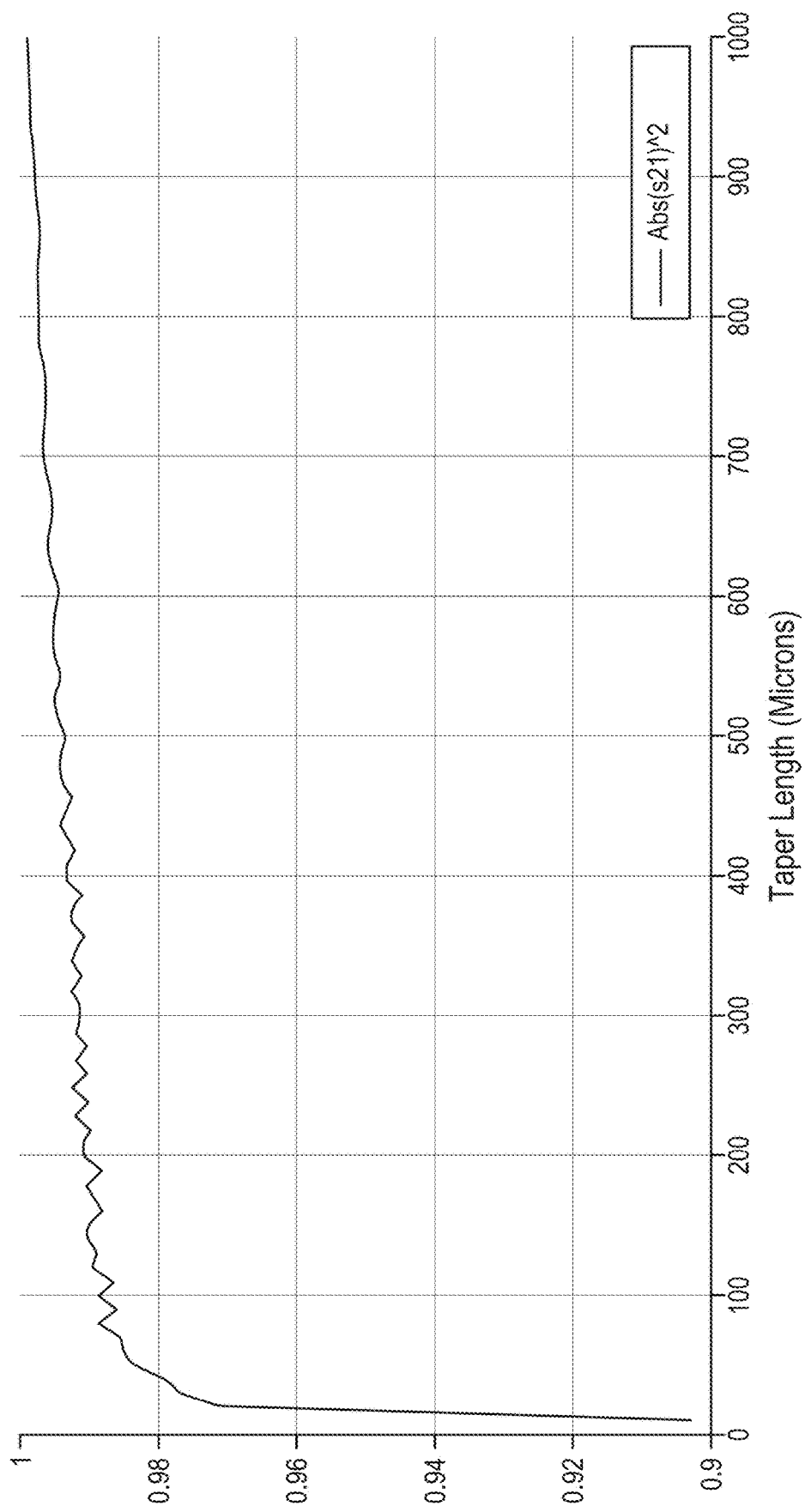
FIG. 6A-6B are graphs illustrating transition losses for tapers of different lengths.
Figure 6B:
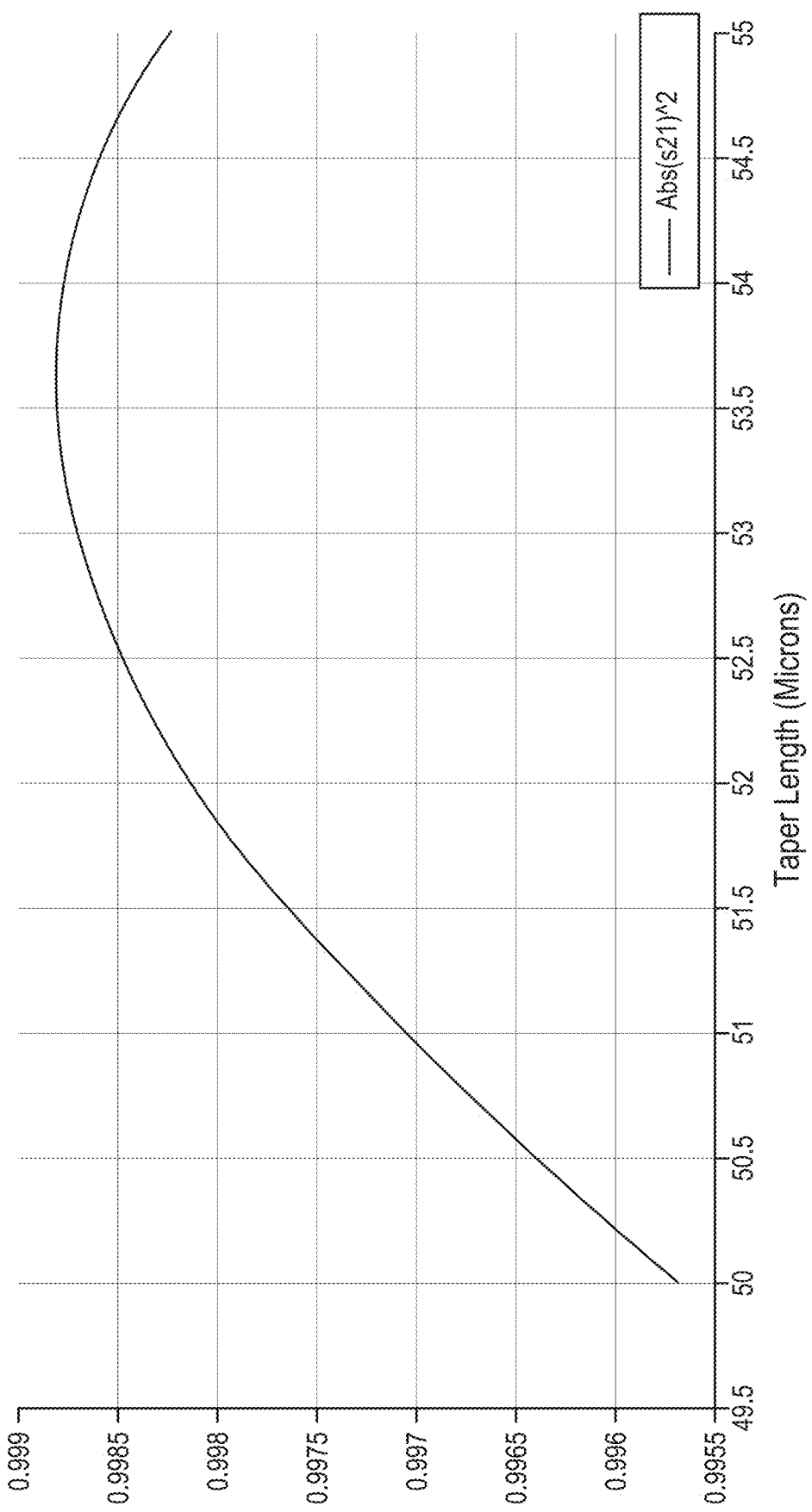

FIG. 6A-6B are graphs illustrating transition losses for tapers of different lengths.

FIG. 6A is a graph illustrating coupling efficiency versus taper length for the second tapering portion 306 of FIG. 5. In FIG. 6A, the horizontal axis represents taper length in microns and the vertical axis represents transmission.

FIG. 6B is a graph illustrating coupling efficiency versus taper length for the first tapering portion 304 of FIG. 5. In FIG. 6B, the horizontal axis represents taper length in microns and the vertical axis represents transmission.

As shown in FIGS. 6A-6B, the transition loss through the first tapering portion 304 and the second tapering portion 306 is relatively small. Transition loss may depend on the configuration of the first tapering portion 304 and the second tapering portion 306. For example, transition loss may depend on the length of the taper and dimensions of the tip of the taper (e.g., width). As shown, for the configuration illustrated in FIG. 5, the transition loss may be approximately 0.04 decibels (dB) for the first tapering portion 304 and the second tapering portion 306 with a total length of less than 200 microns (e.g., transmission of greater than 99%). Accordingly, the configuration of the SOI device 300 as shown in FIG. 5 may transition between the thicker waveguide portion 302 (e.g., 306 nm) and the thinner waveguide portion 308 (e.g., 160 nm) with substantially no transition losses or without significant transition losses. The length of the tapers L1 and L2 may be selected to be sufficiently long such that the tapers 340 and 342 are adiabatic tapers. In particular, the length of the tapers L1 and L2 may be selected to adiabatically transform the optical mode of the optical signals traveling through the waveguides.

In some circumstances, production techniques may permit different etch depths, such as shallow, deep and full etches, to be formed in a single waveguide. However, in other circumstances, this many different etch depths may not feasible for waveguide formation, based on available production techniques. Accordingly, the disclosed embodiments include configurations that have fewer etches, for example, as shown in FIGS. 7A-7C.

Figure 7A:
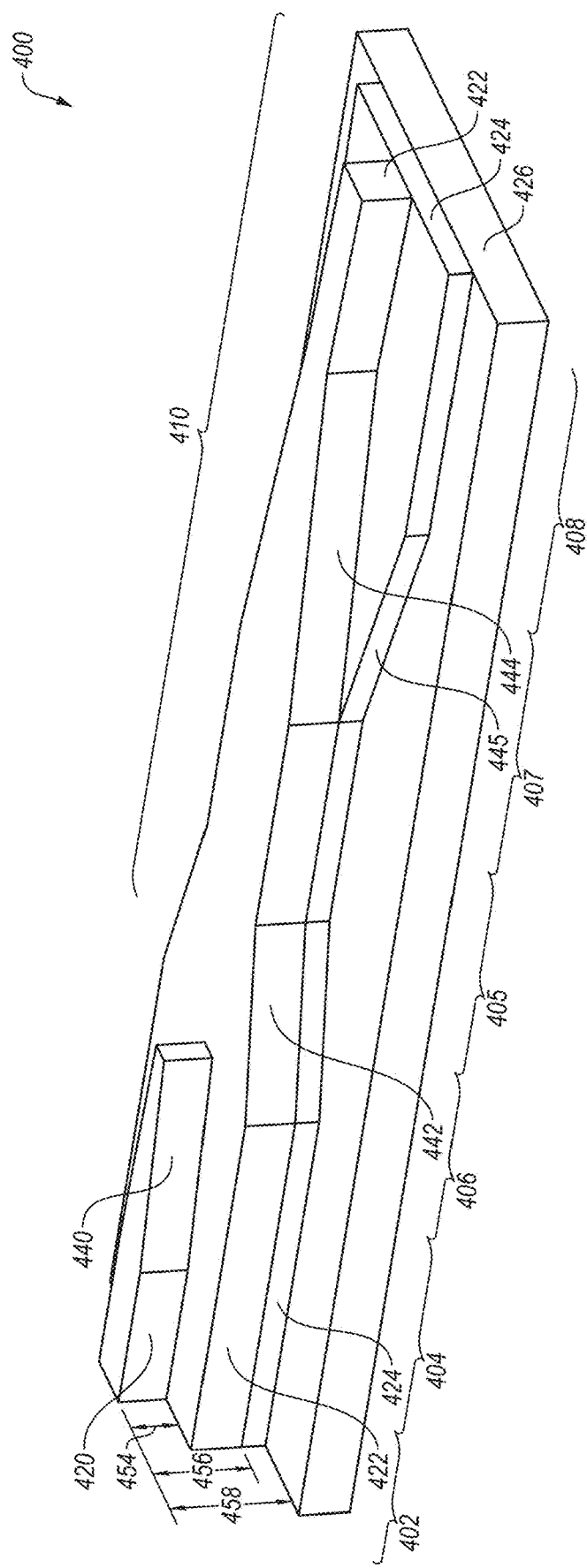
FIGS. 7A-7C are views of another example embodiment of an SOI device.
Figure 7B:
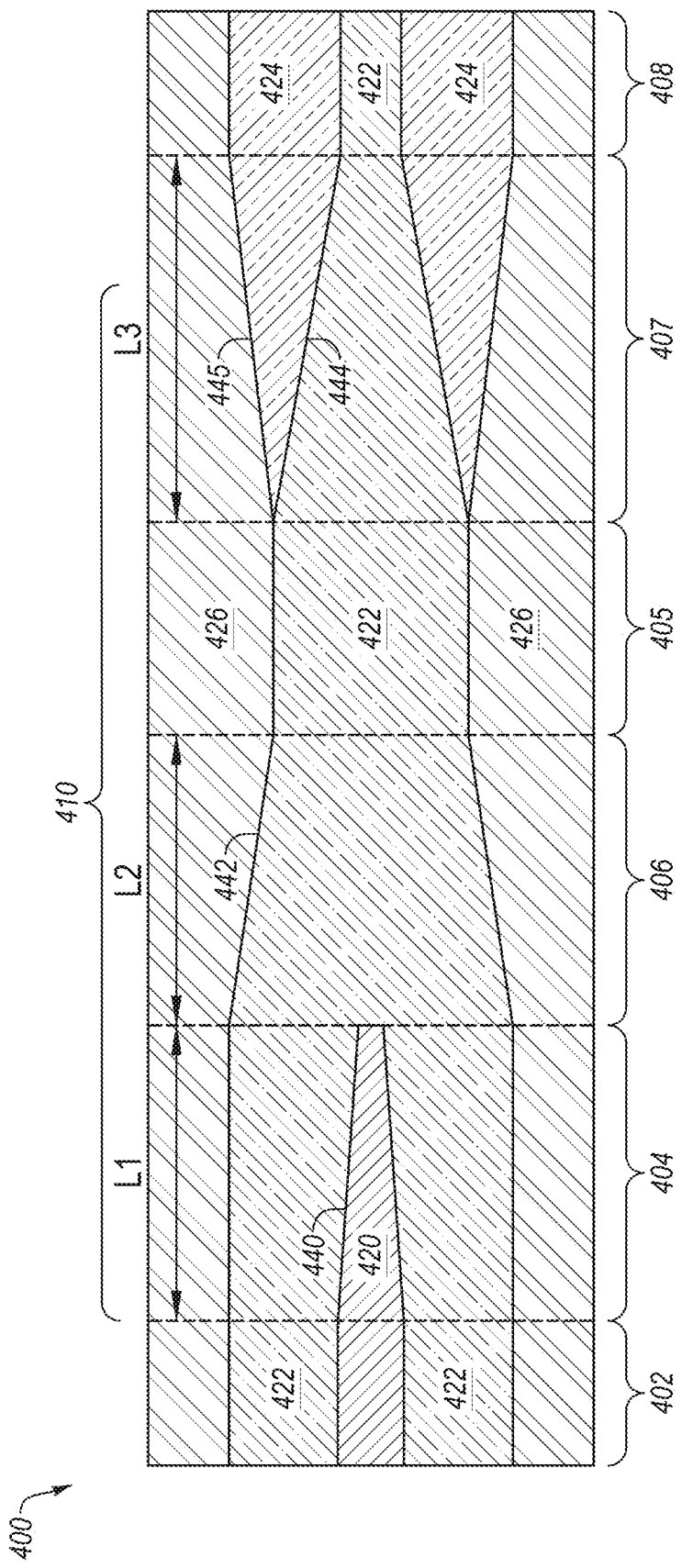
Figure 7C:
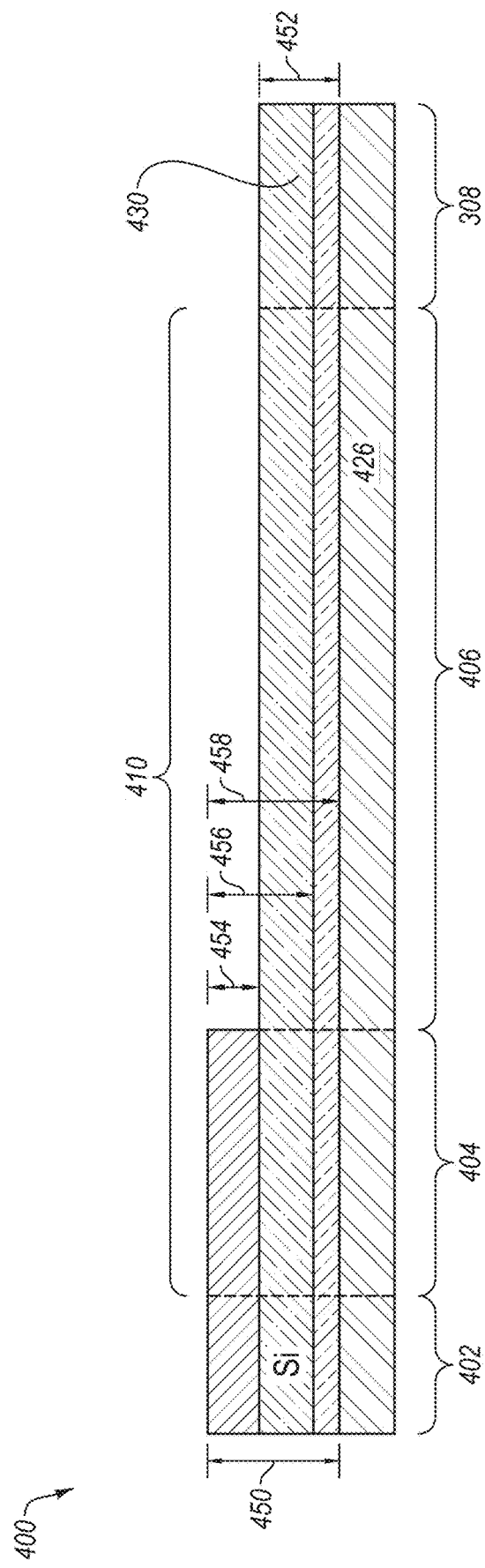

FIGS. 7A-7C are views another example embodiment of an SOI device 400. In particular, FIG. 7A is a perspective view of the SOI device 300, FIG. 7B is a top view of the SOI device 400, and FIG. 7C is a side section of the SOI device 400.

As shown, the SOI device 400 includes a thicker waveguide portion 402 and a thinner waveguide portion 408 with a transition portion 410 positioned in between. In the illustrated configuration, the transition portion 410 includes a first tapering portion 404, a second tapering portion 406, and a third tapering portion 407. The transition portion 410 also includes coupling portion 405 with a constant dimension (e.g., width) between the second tapering portion 406 and the third tapering portion 407. The first tapering portion 404 may include a length L1, the second tapering portion 406 may include a length L2, and the third tapering portion 407 may include a length L3. The SOI device 300 may include cladding 426 (e.g., silicon dioxide cladding) surrounding a silicon waveguide.

The SOI device 400 may transition between the thicker waveguide portion 402 and the thinner waveguide portion 408. For example, in the illustrated configuration the SOI device 400 transitions between a first waveguide thickness 450 and a second waveguide thickness 452 (see FIG. 7C). In some configurations, the first waveguide thickness 450 may be approximately 306 nm at the thicker waveguide portion 402, and the second waveguide thickness 452 may be approximately 160 nm at the thinner waveguide portion 408, although other configurations may be implemented.

The SOI device 400 may include a first waveguide portion 420, a second waveguide portion 422, and a third waveguide portion 424. The first waveguide portion 420 may be formed by a first etch 454, the second waveguide portion 422 may be formed by a second etch 456, and the third waveguide portion 424 may be formed by a third etch 458. The first etch 454 may be a relatively shallow etch, the second etch 456 may be deeper than the first etch 454, and the third etch 458 may be deeper than the first etch 454 and the second etch 456.

In some circumstances, the first etch 454 may be a shallow etch, the second etch 456 may be a deep etch, and the third etch 458 may be a full etch (e.g., extending fully to the cladding 426. In one example, the first etch 454 (e.g., shallow etch) may be 150 nm, the second etch 456 (e.g., deep etch) may be 250 nm and the third etch 458 (e.g., full etch) may be 306 nm. In such configurations, the first waveguide portion 420 may have a thickness of approximately 306 nm (depth from the top of the first waveguide portion 420 to the cladding 426), the second waveguide portion 422 may have a thickness of approximately 160 nm, and the third waveguide portion 424 may have a thickness of approximately 50 nm. However, other configurations may be implemented.

As explained above, some SOI devices may include rib waveguides and strip waveguides. A strip waveguide may have a core with fully etched slabs on both sides of the core, a rib waveguide may have a core with relatively thinner unetched slabs on both sides of the core, a double rib waveguide may have a core with two unetched slabs on both sides of the core. However, some manufacturing processes may not permit double rib waveguide configurations because of process restrictions. Accordingly, the SOI device 400 of FIGS. 7A-7C does not include any double rib waveguides, in contrast to the configuration of the SOI device 300 of FIGS. 5A-5C, which does include a double rib waveguide.

In the illustrated configuration of the SOI device 400, the thicker waveguide portion 402 includes a single rib waveguide, with one slab (e.g., the second waveguide portion 422) surrounding a core (e.g., the first waveguide portion 420). The thinner waveguide portion 408 includes a second single rib waveguide with a slab (e.g., the third waveguide portion 424) surrounding a core (e.g., the second waveguide portion 422). As shown, the first waveguide portion 420 does not extend to the thinner waveguide portion 308 because of the transition portion 410, which transitions the SOI device 400 from a thicker waveguide (e.g., 306 nm) to a thinner waveguide (160 nm).

As shown in FIGS. 7A and 7B, the thicker waveguide portion 402 includes the first waveguide portion 420, the second waveguide portion 422, and the third waveguide portion 424. At the first tapering portion 404, the first waveguide portion 420 includes a first taper 440 while the second waveguide portion 422 and the third waveguide portion 424 remain constant. In some configurations, the first taper 440 may taper between a starting width of 400 nm and a decreased or minimum width of 80 nm. The starting width may depend on dimensions of the standard thick rib waveguide. The minimum width may depend on mode transition and may be determined by minimal tip size of the process.

As shown, the second tapering portion 406 includes only the second waveguide portion 422, not the first waveguide portion 420. At the second tapering portion 406, the second waveguide portion 422 and the third waveguide portion 424 includes a second taper 442. The second taper 442 may taper between a starting width of 2000 nm and a decreased or minimum width of 1000 nm. The starting width may depend on standard dimensions of thick rib waveguide.

At the coupling portion 405, the second waveguide portion 422 and the third waveguide portion 424 include a constant dimension (e.g. width) between the second tapering portion 406 and the third tapering portion 407.

As shown, the third tapering portion 407 includes the second waveguide portion 422 and the third waveguide portion 424. At the third tapering portion 407, the second waveguide portion 422 includes a third taper 444. The third taper 444 may taper between a starting width of 1000 nm and a decreased or minimum width of 700 nm. The starting width may depend on optical performance. The minimum width may depend on standard dimensions of the thinner waveguide portion 408 (e.g., rib waveguide).

In addition, at the third tapering portion 407, the third waveguide portion 424 includes a fourth taper 445. However, the third taper 445 may increase the width of the third waveguide portion 424. The fourth taper 445 may taper between a starting width of 1000 nm and an increased or maximum width of 3.6 µm. The starting width may depend on width of the 426. The maximum width may depend on the standard dimensions of the thin rib waveguide.

In some configurations, the first taper 440, the second taper 442, the third taper 444, and the fourth taper 445 may be adiabatic tapers. In such configurations, the mode may be transferred through the waveguide at each of the tapers 440, 442, 444, 445 without transition losses. Additionally or alternatively, the transition at the tapers 440, 442, 444, 445 may be sufficiently gradual and/or smooth that transition losses at the tapers 440, 442, 444, 445 are minimized or eliminated.

In the illustrated configuration, the SOI device 400 transitions from a single rib waveguide with a thickness of 306 nm (e.g., the first waveguide portion 420) to a single rib waveguide with a thickness of 160 nm (e.g., the second waveguide portion 422) using a three-level taper design. In particular, the first tapering portion 404 transitions the single rib waveguide on 306 nm SOI (e.g., the thicker waveguide portion 402) to a strip waveguide on 160 nm SOI (e.g., at the second taper 406), the second taper 406 transitions the wide 160 nm strip waveguide to a narrow 160 nm strip waveguide (e.g., at the coupling portion 405) to reduce the lateral mode size, and the third taper 407 transitions the strip waveguide on 160 nm SOI (e.g., the coupling portion 405) to a rib waveguide on 160 nm SOI (e.g., at the thinner waveguide portion 408). The SOI device 400 includes the coupling portion 405 after the second taper 406 to allow the mode of the optical signals to stabilize before reaching the third tapering portion 407.

Figure 8A:
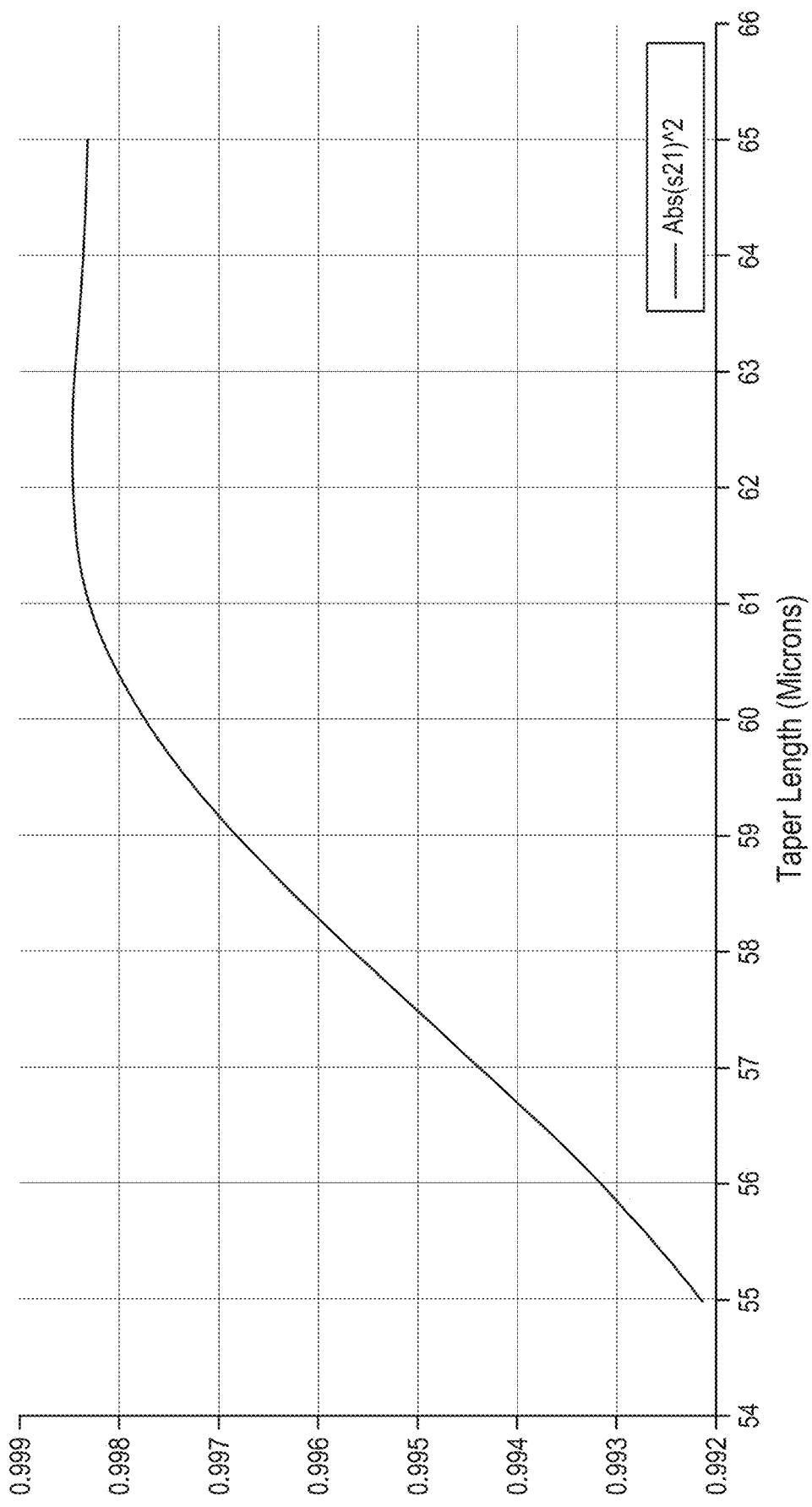
Figure 8C:
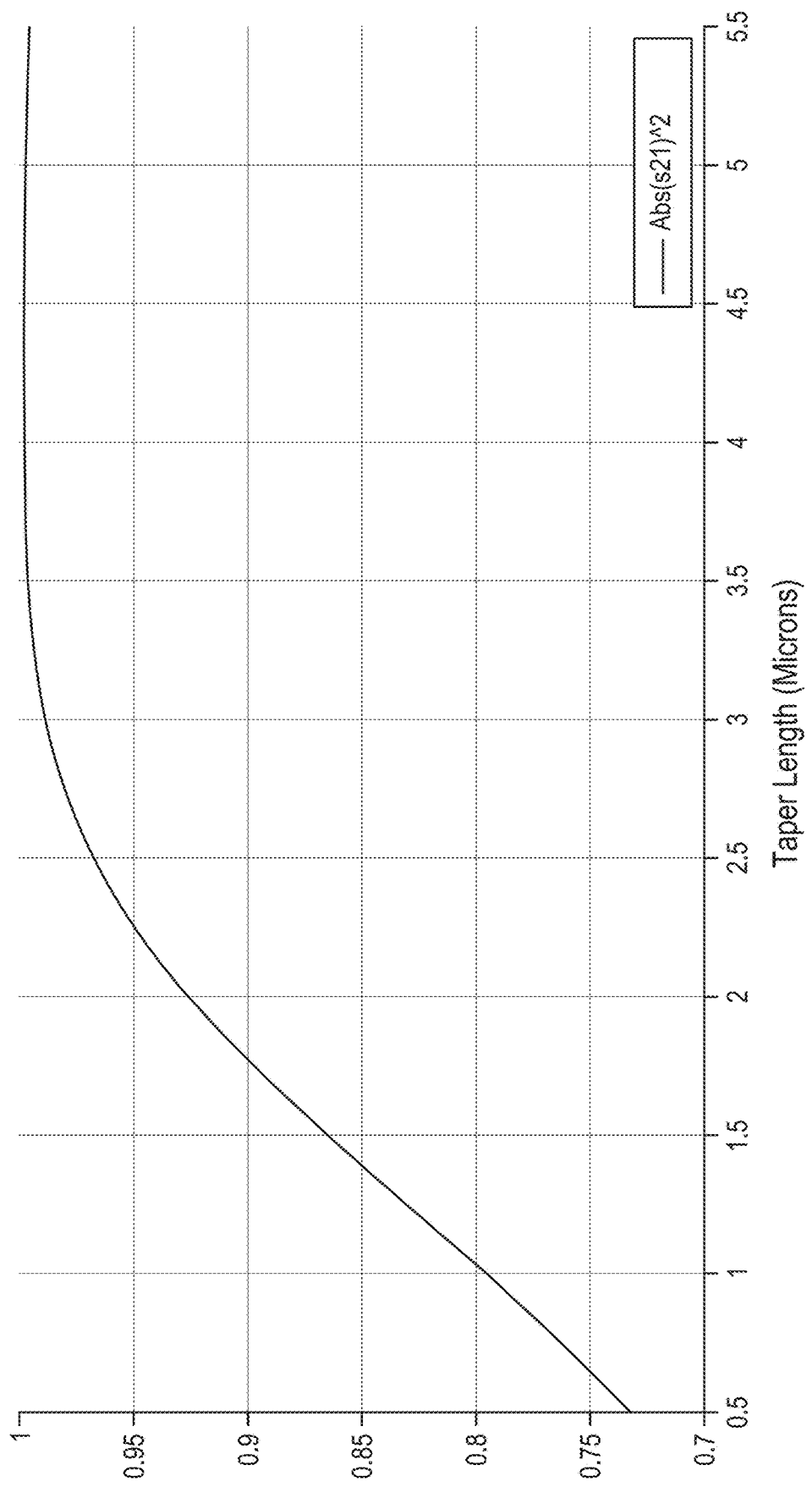

FIGS. 8A-8C are graphs illustrating transition losses for tapers of different lengths.

FIG. 8A is a graph illustrating coupling efficiency versus taper length for the first tapering portion 404 of FIG. 7. In FIG. 8A, the horizontal axis represents taper length in microns and the vertical axis represents transmission.

FIG. 8B is a graph illustrating coupling efficiency versus taper length for the second tapering portion 406 of FIG. 7. In FIG. 8B, the horizontal axis represents taper length in microns and the vertical axis represents transmission.

FIG. 8C is a graph illustrating coupling efficiency versus taper length for the third tapering portion 407 of FIG. 7. In FIG. 8C, the horizontal axis represents taper length in microns and the vertical axis represents transmission.

As shown in FIGS. 8A-8C, the transition loss through the first tapering portion 404, the second tapering portion 406, and the third tapering portion 407 is relatively small. Transition loss may depend on the configuration of the first tapering portion 404, the second tapering portion 406, and the third tapering portion 407. For example, transition loss may depend on the length of the taper and dimensions of the tip of the taper (e.g., width). As shown, for the configuration illustrated in FIG. 7, the transition loss may be approximately 0.04 decibels (dB) for the first tapering portion 404, the second tapering portion 406, and the third tapering portion 407 with a total length of less than 100 microns (e.g., transmission of greater than 99%). Accordingly, the configuration of the SOI device 400 as shown in FIG. 7 may transition between the thicker waveguide portion 402 (e.g., 306 nm) and the thinner waveguide portion 408 (e.g., 160 nm) with substantially no transition losses or without significant transition losses.

As shown, the length of the tapers L1, L2, L3 may be selected to be sufficiently long such that the tapers 440, 442, 444, 445 are adiabatic tapers. In particular, the length of the tapers L1, L2 and L3 may be selected to adiabatically transform the optical mode of the optical signals traveling through the waveguides.

In the disclosed embodiments, a wide multimode strip waveguide with a thickness of 160 nm 405 and 406 is positioned in the middle of the transitions to improve fabrication tolerance and reduce the risk of etch mask overlay offset errors for the transitions.

Figure 9A:
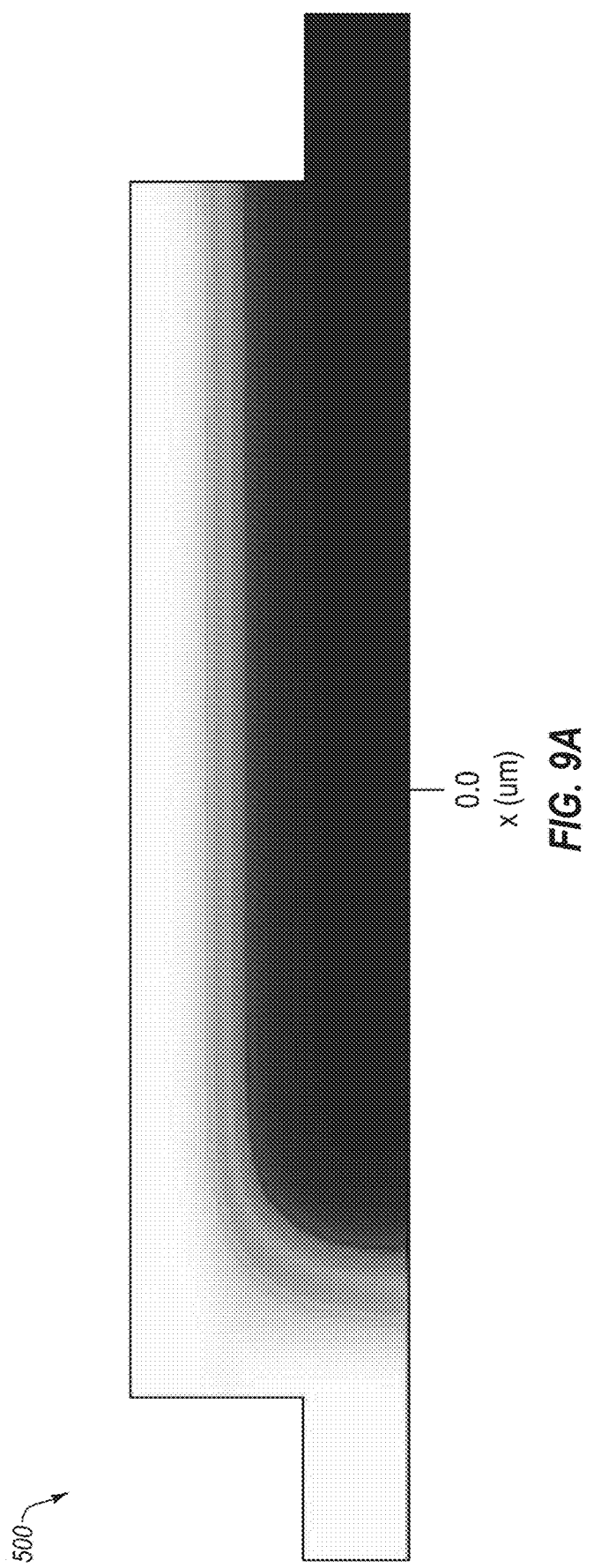
FIG. 9A is a simulated carrier concentration map of a cross-section of a vertical junction SOI modulator.

FIG. 9A is a simulated carrier concentration map of a cross-section of a vertical junction SOI modulator. In FIG. 9A, the different shading represents carrier density in the SOI modulator 500.

Figure 9B:
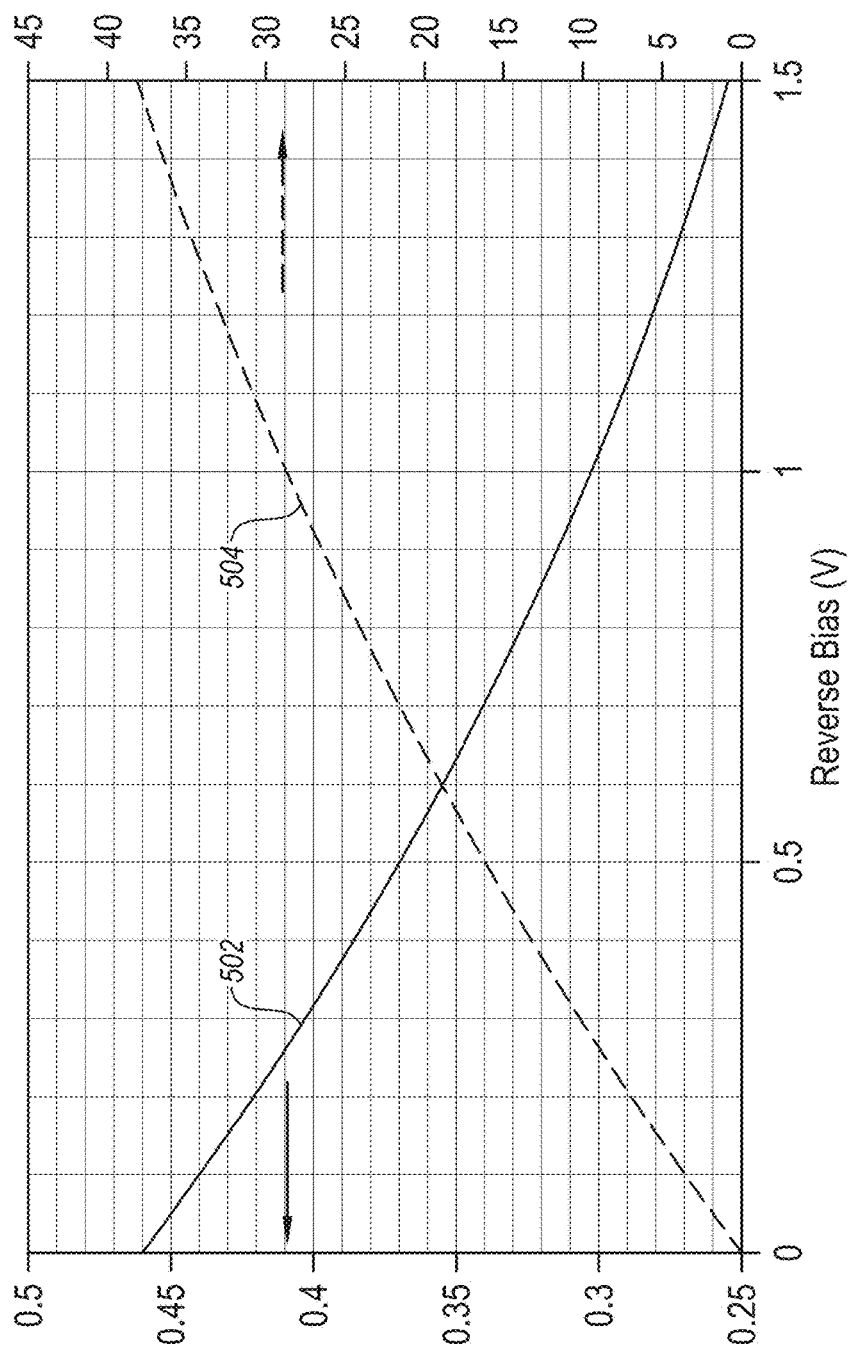
FIG. 9B is a graph illustrating the performance of the vertical junction SOI modulator of FIG. 9A.

FIG. 9B is a graph illustrating the performance of the SOI modulator 500 of FIG. 9A. In FIG. 9A, the horizontal axis represents reverse bias in Volts, the left side of the vertical axis represents insertion loss in dB/mm, and the right side of the vertical axis represents phase shift in degrees/mm.

FIG. 9B includes a line 502 representing insertion loss of optical signals travelling the SOI modulator 500 in dB/mm, and a line 504 representing phase shift of optical signals travelling the SOI modulator 500 in degrees/mm. FIG. 9B also includes a table comparing the modulation efficiency VpiL, the insertion loss, and the figure of merit (FOM) for a 306 nm SOI and a 160 nm SOI. The VpiL represents the voltage and length needed to achieve one Pi phase shift. The FOM is determined by VpiL*IL. As shown, the Vpil decreases from 16.2 V·mm at 1.8 V for 306 nm SOI to 7.1 V·mm at 1.5 V for 160 nm SOI; the insertion loss decreases from 0.57 dB/mm to 0.45 dB/mm; and the FOM decreases from 9.2 V·dB to 3.2 V·dB.

In some example embodiments, an optical circuit for optical modulation of light may include an input waveguide including a first thickness, an optical modulator including a second thickness, and a tapered transition that optically couples the optical modulator and the input waveguide. The second thickness may be smaller than the first thickness. The tapered transition may adiabatically transform the optical mode of the input waveguide to the optical modulator.

The tapered transition may include a first waveguide portion including the first thickness and a second waveguide portion including the second thickness. The tapered transition may include a first tapering portion that may include a first length; and a second tapering portion that may include a second length. The first length and the second length may be sufficiently large enough to adiabatically transform the optical mode of the optical signals traveling through the first tapering portion and the second tapering portion.

The tapered transition may include a first waveguide portion that may include a first taper, a second waveguide portion that may include a second taper, and a third waveguide portion that may include a third taper. The first waveguide portion may have a first thickness, the second waveguide portion may have a second thickness, and the third waveguide portion may have a third thickness. The first thickness may be larger than the second thickness, and the second thickness may be larger than the third thickness.

The first waveguide portion may be formed by a first etch, the second waveguide portion may be formed by a second etch deeper than the first etch, and the third waveguide portion may be formed by a third etch deeper than the second etch. The first waveguide portion may be a double rib waveguide and the third waveguide portion may be a rib waveguide.

The tapered transition may include a first tapering portion that includes a first length, a second tapering portion that includes a second length, and a third tapering portion that includes a third length. The first length, the second length, and the third length may be sufficiently large enough to adiabatically transform the optical mode of the optical signals traveling through the first tapering portion and the second tapering portion.

The optical circuit further may include a coupling portion between the second tapering portion and the third tapering portion to allow the mode of optical signals to stabilize before reaching the third tapering portion.

The tapered transition may include a first waveguide portion that includes a first thickness, a second waveguide portion that includes a second thickness, and a third waveguide portion that includes a third thickness. The first thickness may be larger than the second thickness, and the second thickness may be larger than the third thickness. The first waveguide portion may be a rib waveguide, the second taper may be a strip waveguide, and the third waveguide portion may be a rib waveguide.

The optical circuit further may include a first taper decreasing the width of the first waveguide portion, a second taper decreasing the width of the second waveguide portion and the third waveguide portion, a third taper decreasing the width of the second waveguide, and a fourth taper increasing the width of the third waveguide portion.

The optical modulator may be a Mach-Zehder modulator. The first thickness may be between 300 nm and 310 nm and the second thickness may be between 160 nm and 220 nm. The optical modulator may include an n-doped region and a p-doped region. The n-doped region and the p-doped region may be positioned vertically with respect to one another in a waveguide to form a vertical PN junction.

The optical circuit may include a silicon on insulator photonic device. The second thickness of the optical modulator may be smaller than the first thickness of the input waveguide to improve optical confinement of the optical modulator. The tapered transition may confine the optical mode from the first thickness of the input waveguide to the second thickness of the optical modulator. The optical mode may be confined with substantially no transition loss through the tapered transition.

The optical circuit further may include cladding surrounding at least a portion of the tapered transition. In some configurations, the optical modulator includes an input and an output including the second thickness. The optical circuit may further include an output waveguide, and the output waveguide may include the first thickness. The output waveguide may be optically coupled to the optical modulator.

The terms and words used in the description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

As used herein, an "electrical component" refers to a component that involves electricity, an "optical component" refers to a component that involves electromagnetic radiation (e.g., visible light or others), and an "optoelectronic component" refers to a component that involves both electrical signals and optical signals, and/or the conversion of electrical signals to optical signals, or vice versa.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. An optical circuit for optical modulation of light comprising:
   an input waveguide including a first thickness,
   an optical modulator including a second thickness, wherein the second thickness is smaller than the first thickness; and
   a tapered transition that optically couples the optical modulator and the input waveguide, wherein the tapered transition adiabatically transforms the optical mode of the input waveguide to the optical modulator, the tapered transition comprising:
- a first waveguide portion defined by a first etch, a second waveguide portion positioned over the first waveguide portion and defined by a second etch deeper than the first etch, and a third waveguide portion positioned over the second waveguide portion and defined by a third etch deeper than the second etch;
- a double rib waveguide portion comprising the first waveguide portion, the second waveguide portion and the third waveguide portion, the double rib waveguide portion defined by the first etch, the second etch and the third etch;
- a rib waveguide portion comprising the second waveguide portion and the third waveguide portion, the rib waveguide portion defined by the second etch and the third etch;
- a first taper positioned on the first waveguide portion and defined by the first etch;
- a second taper positioned on the second waveguide portion and defined by the second etch; and
- a third taper positioned on the third waveguide portion and defined by the third etch;
- wherein the first taper, the second taper, and the third taper are positioned between the double rib waveguide portion and the rib waveguide portion to transition the optical mode of optical signals from the double rib waveguide portion and the rib waveguide portion.

2. The optical circuit of claim 1, the first taper including the first thickness and the second taper including the second thickness.

3. The optical circuit of claim 1, wherein:
the first taper includes a first length; and
the second taper includes a second length;
wherein the first length and the second length are sufficiently large enough to adiabatically transform the optical mode of the optical signals traveling through the first taper and the second taper.

4. The optical circuit of claim 1, wherein:
the first waveguide portion includes a first thickness;
the second waveguide portion includes a second thickness;
the third waveguide portion includes a third thickness; and
the first thickness is larger than the second thickness, and the second thickness is larger than the third thickness.

5. The optical circuit of claim 1, wherein
the first taper includes a first length;
the second taper includes a second length; and
the third taper includes a third length;
wherein the first length, the second length, and the third length are sufficiently large enough to adiabatically transform the optical mode of the optical signals traveling through the first taper and the second taper.

6. The optical circuit of claim 1:
the first waveguide portion including a first thickness;
the second waveguide portion including a second thickness;
the third waveguide portion including a third thickness; and
the first thickness is larger than the second thickness, and the second thickness is larger than the third thickness.

7. The optical circuit of claim 6, further comprising:
a first taper decreasing the width of the first waveguide portion;
a second taper decreasing the width of the second waveguide portion and the third waveguide portion;
a third taper decreasing the width of the second waveguide; and
a fourth taper increasing the width of the third waveguide portion.

8. The optical circuit of claim 6, wherein the optical modulator is a Mach-Zehder modulator.

9. The optical circuit of claim 6, wherein the first thickness is between 300 nm and 310 nm and the second thickness is between 160 nm and 220 nm.

10. The optical circuit of claim 1, the optical modulator comprising:
an n-doped region; and
a p-doped region;
wherein the n-doped region and the p-doped region are positioned vertically with respect to one another in a waveguide to form a vertical PN junction.

11. The optical circuit of claim 1, the optical circuit comprising a silicon on insulator photonic device.

12. The optical circuit of claim 1, wherein the second thickness of the optical modulator being smaller than the first thickness of the input waveguide improves optical confinement of the optical modulator.

13. The optical circuit of claim 1, wherein the tapered transition confines the optical mode from the first thickness of the input waveguide to the second thickness of the optical modulator.

14. The optical circuit of claim 1, wherein the optical mode is confined with substantially no transition loss through the tapered transition.

15. The optical circuit of claim 1, further comprising cladding surrounding at least a portion of the tapered transition.

16. An optical circuit for optical modulation of light comprising:
an input waveguide including a first thickness, an optical modulator including a second thickness, wherein the second thickness is smaller than the first thickness; and
a tapered transition that optically couples the optical modulator and the input waveguide, wherein the tapered transition adiabatically transforms the optical mode of the input waveguide to the optical modulator, the tapered transition comprising:
- a first waveguide portion defined by a first etch;
- a second waveguide portion defined by a second etch deeper than the first etch;
- a third waveguide portion defined by a third etch deeper than the second etch;
- a double rib waveguide portion comprising the first waveguide portion, the second waveguide portion and the third waveguide portion, the double rib waveguide portion defined by the first etch, the second etch and the third etch;
- a rib waveguide portion comprising the second waveguide portion and the third waveguide portion, the rib waveguide portion defined by the second etch and the third etch;
- a first tapering portion including a first taper that decreases the width of the first waveguide portion while widths of the second waveguide portion and the third waveguide portion remain constant; and
- a second tapering portion including a second taper that decreases the width of the second waveguide portion and a third taper that decreases the width of the third waveguide portion along a length of the tapered transition where the first waveguide portion does not extend;

wherein the first taper, the second taper, and the third taper are positioned between the double rib waveguide portion and the rib waveguide portion to transition the optical mode of optical signals from the double rib waveguide portion and the rib waveguide portion.

* * * * *